US006774786B1

United States Patent
Havekost et al.

(10) Patent No.: US 6,774,786 B1
(45) Date of Patent: Aug. 10, 2004

(54) INTEGRATED ALARM DISPLAY IN A PROCESS CONTROL NETWORK

(75) Inventors: Robert B. Havekost, Austin, TX (US); Trevor D. Schleiss, Austin, TX (US); Michael G. Ott, Austin, TX (US); Cindy Scott, Georgetown, TX (US); J. Clint Fletcher, Pflugerville, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 327 days.

(21) Appl. No.: 09/707,580

(22) Filed: Nov. 7, 2000

(51) Int. Cl.[7] .......................... G08B 23/00; G05B 11/01
(52) U.S. Cl. ................... 340/517; 340/500; 340/525; 340/506; 340/521; 700/17; 700/83; 702/183; 702/188
(58) Field of Search ................ 340/517, 500, 340/525, 506, 501, 521; 700/11, 12, 17, 80, 21, 83; 702/183–185, 187, 188; 709/318

(56) References Cited

U.S. PATENT DOCUMENTS

| 4,644,478 A | | 2/1987 | Stephens et al. ............ 700/80 |
| 5,353,315 A | * | 10/1994 | Scarola et al. ............. 340/525 |
| 5,631,825 A | * | 5/1997 | van Weele et al. .......... 700/83 |
| 5,768,119 A | | 6/1998 | Havekost et al. ........... 700/83 |

FOREIGN PATENT DOCUMENTS

| EP | 0 959 398 A1 | 11/1999 |
| GB | 2 083 258 A | 3/1982 |

OTHER PUBLICATIONS

Great Britain Examination Report under Section 18(3) issued on Dec. 17, 2003 in Application GB 0126490.2.

* cited by examiner

Primary Examiner—Donnie L. Crosland
(74) Attorney, Agent, or Firm—Marshall, Gerstein & Borun LLP

(57) ABSTRACT

An alarm display and interface tool for use in a process control system receives and displays different categories of alarms, including for example, device alarms and hardware alarms as well as traditional process alarms, on a single display to enable an operator or other user to view and have access to these different categories of alarms. The display and interface tool may be used to filter the alarms that are displayed according to any number of categories, including the category of the alarm, the priority of the alarm, the status of the alarm, etc. so as to alternatively segregate or combine the tasks typically associated with operator, maintenance and engineer personnel. The tool may also be used to access each of the displayed alarms to obtain more information about any individual alarm.

62 Claims, 8 Drawing Sheets

| FIC-101 | i | | i | | i | | i | | i |

Mon 15:10:04 | Reactor 1 jacket heat flow | FIC-101/HI_ALM | HIGH | WARNING

Time      Unit       Alarm Parameter   Module Description         Alarm Word   Alarm Message                            Priority
Mon 15:10:04  REACTOR1  FIC-101/HI_ALM  Reactor 1 jacket heat flow  HIGH         High Alarm Value 1027 Limit 1000   WARNING

FIG. 5

| FV-101 | i | FIC-101 | i | | i | | i | | i |

Mon 15:10:04 | Reactor 1 inlet valve | FV-101/FAILED_ALM | FAILED | CRITICAL

Time      Unit       Alarm Parameter     Module Description     Alarm Word   Alarm Message                Priority
Mon 15:10:04  REACTOR1  FV-101/FAILED_ALM  Reactor 1 inlet valve  FAILED       I/P Feedback limit: 103.47   CRITICAL

FIG. 6

| CTLR1 | i | FIC-101 | i | | i | | i | | i |

Mon 15:10:04 | Room 4, cab 3, pos 2 | CTLR1/CARD04_FAIL | FAILED | CRITICAL

Time      Unit       Alarm Parameter        Module Description      Alarm Word   Alarm Message        Priority
Mon 15:10:04                  CTLR1/CARD04_FAIL  Room 4, cab 3, pos 2   FAILED       Channel 7 failed     CRITICAL

FIG. 7

| Date Time | Event Type | Category | Area | Node | Module | Parameter | State | Level | Desc1 | Desc2 |
|---|---|---|---|---|---|---|---|---|---|---|
| xxxxxx | ALARM | PROCESS | AREA_A | CTLR1 | REACTOR1 FIC-101 | HI_ALM | ACT UNACK | 11-WARNING | HIGH | High Alarm Value 1027 Limit 1000 |
| xxxxxx | ALARM | PROCESS | AREA_A | CTLR1 | REACTOR1 FIC-101 | HI_ALM | ACT ACK | 11-WARNING | HIGH | High Alarm Value 1014 Limit 1000 |
| xxxxxx | ALARM | PROCESS | AREA_A | CTLR1 | REACTOR1 FIC-101 | HI_ALM | INACT ACK | 11-WARNING | HIGH | High Alarm Value 998 Limit 1000 |

| Date Time | Event Type | Category | Area | Node | Module | Parameter | State | Level | Desc1 | Desc2 |
|---|---|---|---|---|---|---|---|---|---|---|
| xxxxxx | ALARM | DEVICE | AREA_A | CTLR1 | REACTOR1 FV-101 | FAILED_ALM | ACT UNACK | 15-CRITICAL | FAILED | I/P Feedback limited: 103.47 |
| xxxxxx | ALARM | DEVICE | AREA_A | CTLR1 | REACTOR1 FV-101 | FAILED_ALM | ACT ACK | 15-CRITICAL | FAILED | I/P Feedback limited: 103.47 |
| xxxxxx | ALARM | DEVICE | AREA_A | CTLR1 | REACTOR1 FV-101 | FAILED_ALM | INACT ACK | 15-CRITICAL | OK | I/P Feedback limited: 99.8 |

FIG. 15

| Occurred | Unit | Alarm Parameter | Description | Alarm | Message | Priority |
|---|---|---|---|---|---|---|
| Wed 12:46:30 | | FIC-501/HI_ALM | Tank 5 outlet flow control | HI | Value = 1011.4 Limit = 1000 | WARNING |
| Wed 11:48:54 | REACTOR1 | FV-101/FAILED_ALM | Reactor 1 jacket flow sensor | FAILED | I/P Feedback limit 103.7 | WARNING |
| ✓ Wed 10:51:18 | REACTOR3 | LIC-301/HI_HI_ALM | Reactor 3 Level control | HIHI | Value = 81.4 Limit = 78 | CRITICAL |
| ✓ Wed 09:53:42 | | FIC-501/HI_ALM | Tank 5 outlet flow control | HI | Value = 1011.4 Limit = 1000 | WARNING |
| ✓ Wed 08:56:06 | REACTOR2 | FV-102/MAINT_ALM | Reactor 2 jacket flow sensor | MAINT | Travel limit 35001 | WARNING |
| ✓ Wed 07:58:30 | | FIC-501/HI_ALM | Tank 5 outlet flow control | HI | Value = 1011.4 Limit = 1000 | WARNING |
| ✓ Wed 07:00:54 | | FIC-501/HI_ALM | Tank 5 outlet flow control | HI | Value = 1011.4 Limit = 1000 | WARNING |
| ✓ Wed 06:03:18 | REACTOR1 | LIC-101/HI_HI_ALM | Reactor 1 Level control | HIHI | Value = 81.4 Limit = 78 | ADVISORY |
| ✓ Wed 05:05:42 | REACTOR2 | LIC-102/HI_HI_ALM | Reactor 2 Level control | HIHI | Value = 81.4 Limit = 78 | ADVISORY |
| ✓ Wed 04:08:06 | | FV-502/ADVISE_ALM | Tank 5 outlet flow sensor | ADVISE | Low variation for 60 minutes | ADVISORY |

Process: 1 / 34   Device: 1 / 2   Sort: Banner

FIG. 12

| Occurred | Unit | Alarm Parameter | Description | Alarm | Message | Priority |
|---|---|---|---|---|---|---|
| Wed 12:46:30 | | FIC-501/HI_ALM | Tank 5 outlet flow control | HI | Value = 1011.4 Limit = 1000 | WARNING |
| Wed 11:48:54 | REACTOR1 | FV-101/FAILED_ALM | Reactor 1 jacket flow sensor | FAILED | I/P Feedback limit 103.7 | WARNING |
| | | | | HIHI | | |
| ✓ Wed 09:53:42 | | FIC-501/HI_ALM | Tank 5 outlet flow control | HI | Value = 1011.4 Limit = 1000 | WARNING |
| ✓ Wed 08:56:06 | REACTOR2 | FV-102/MAINT_ALM | Reactor 2 jacket flow sensor | MAINT | Travel limit 35001 | WARNING |
| ✓ Wed 07:58:30 | | FIC-501/HI_ALM | Tank 5 outlet flow control | HI | Value = 1011.4 Limit = 1000 | WARNING |
| ✓ Wed 07:00:54 | | FIC-501/HI_ALM | Tank 5 outlet flow control | HI | Value = 1011.4 Limit = 1000 | WARNING |
| Wed 06:03:18 | REACTOR1 | LIC-101/HI_HI_ALM | Reactor 1 Level control | HIHI | Value = 81.4 Limit = 78 | ADVISORY |
| Wed 05:05:42 | REACTOR2 | LIC-102/HI_HI_ALM | Reactor 2 Level control | HIHI | Value = 81.4 Limit = 78 | ADVISORY |
| Wed 04:08:06 | | FV-502/ADVISE_ALM | Tank 5 outlet flow sensor | ADVISE | Low variation for 60 minutes | ADVISORY |

Process: 1 / 34   Device: 1 / 2   Sort: Banner

FIG. 13

| Occurred | Unit | Alarm Parameter | Description | Alarm | Message | Priority |
|---|---|---|---|---|---|---|
| Wed 12:46:30 | | FIC-501/HI_ALM | Tank 5 outlet flow control | HI | Value = 1011.4 Limit = 1000 | WARNING |
| Wed 11:48:54 | REACTOR1 | FV-101/FAILED_ALM | Reactor 1 jacket flow sensor | FAILED | I/P Feedback limit 103.7 | WARNING |
| ✓ Wed 10:51:18 | REACTOR3 | LIC-301/HI_HI_ALM | Reactor 3 Level control | HIHI | Value = 81.4 Limit = 78 | CRITICAL |
| ✓ Wed 09:53:42 | | FIC-501/HI_ALM | Tank 5 outlet flow control | HI | Value = 1011.4 Limit = 1000 | WARNING |
| Wed 08:56:06 | REACTOR2 | FV-102/MAINT_ALM | Reactor 2 jacket flow sensor | MAINT | Travel limit 35001 | WARNING |
| ✓ Wed 07:58:30 | | FIC-501/HI_ALM | Tank 5 outlet flow control | HI | Value = 1011.4 Limit = 1000 | WARNING |
| ✓ Wed 07:00:54 | | FIC-501/HI_ALM | Tank 5 outlet flow control | HI | Value = 1011.4 Limit = 1000 | WARNING |
| ✓ Wed 06:03:18 | REACTOR1 | LIC-101/HI_HI_ALM | Reactor 1 Level control | HIHI | Value = 81.4 Limit = 78 | ADVISORY |
| ✓ Wed 05:05:42 | REACTOR2 | LIC-102/HI_HI_ALM | Reactor 2 Level control | HIHI | Value = 81.4 Limit = 78 | ADVISORY |
| Wed 04:08:06 | | FV-502/ADVISE_ALM | Tank 5 outlet flow sensor | ADVISE | Low variation for 60 minutes | ADVISORY |

INTEGRATED ALARM DISPLAY IN A PROCESS CONTROL NETWORK

FIELD OF THE INVENTION

The present invention relates generally to process control systems and, more particularly, to the display of alarm conditions within a process control system.

DESCRIPTION OF THE RELATED ART

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such, as opening or closing valves and measuring process parameters. The process controller receives signals indicative of process measurements made by the field devices and/or other information pertaining to the field devices, uses this information to implement a control routine and then generates control signals which are sent over the buses or other communication lines to the field devices to control the operation of the process. Information from the field devices and the controllers is sometimes made available to one or more applications executed by the operator workstation to enable an operator to perform desired functions with respect to the process, such as viewing the current state of the process, modifying the operation of the process, etc. Some known controller/operator interface software is designed to generate and display process alarms resulting from process control operations performed by software in the controllers or other devices.

The DeltaV process control system sold by Fisher Rosemount Systems, Inc. uses function blocks located or installed in controllers or different field devices to perform control operations. The controllers and, in some cases, the field devices are capable of storing and executing one or more function blocks, each of which receives inputs from and/or provides outputs to other function blocks (either within the same device or within different devices), and performs some process control operation, such as measuring or detecting a process parameter, controlling a device or performing a control operation, like implementing a proportional-derivative-integral (PID) control routine. The different function blocks within a process control system are configured to communicate with each other (e.g., within a single device or over a bus) to form one or more process control loops, the individual operations of which can thus be spread throughout the process.

Typically, the function blocks or the devices in which these function blocks are implemented are configured to detect errors, faults or problems that occur within the process control loops or the functions being performed therein and to send a signal, such as an alarm message, to notify an operator at an operator workstation or other user interface that an undesirable condition exists within the process control system or within a control loop of the process control system. Such alarms may indicate, for example, that a function block is not communicating, has received or generated an out of range input or output, is undergoing a fault or other undesirable condition, etc. In the current alarm display systems, an application executed at, for example, an operator interface/workstation, is configured to receive messages containing process alarms related to process operation and to display these process alarms in a coherent and manageable manner to thereby enable an operator to manage alarms in some organized or logical way. Such an operator interface system is described in U.S. Pat. No. 5,768,119, entitled "Process Control System Including Alarm Priority Adjustment" which is hereby expressly incorporated by reference herein.

Known operator interface applications, such as that described in U.S. Pat. No. 5,768,119, are typically configured to enable an operator, i.e., the person overseeing the actual day-to-day operation of a process control system, to view the most critical process alarms, e.g., the alarms with the highest priority, first. Because these applications are designed with the object of providing information to a process control operator, they only display alarms associated with the functioning of the process itself. These applications are not configured to display other types of errors or alarms, such as alarms associated with malfunctioning field devices or other hardware like controllers or input/output (I/O) devices. Thus, for example, in the system described in U.S. Pat. No. 5,768,119, an operator display application displays a section of a process control system and provides an alarm banner on the bottom of the display indicating the highest priority process alarms. The displayed alarms are process alarms because they are generated by function blocks or other software used to implement a process control scheme or a process control loop and to indicate an error in the functioning of a process control loop. When an operator selects one of the process alarms at the operator workstation, the application provides the operator more information related to the selected alarm, such as the function block or module which generated the alarm, the priority of the alarm, whether the alarm has been acknowledged, etc. and may display information about the process relevant to the alarm, such as a faceplate for the loop in which the alarm occurred, a primary control display related to the portion of the plant in which the alarm occurred, etc.

Using these known displays, an operator can recognize the existence of an alarm and can try to fix the problem using other software applications available to the operator. In some cases, the operator may determine, based on the process alarms present, that one or more field devices or other hardware components may need repair or replacement. If this is the case, the operator may call or otherwise contact a maintenance person to schedule the device for testing, repair or replacement. Similarly, the operator may call an engineer to handle the alarm. In this manner, the operator detects a device or hardware problem based on received process alarms and manually hands the problem off to maintenance or engineer personnel to correct the problem. However, it requires an experienced or knowledgeable operator to detect device or hardware problems from process alarms.

In the past, conventional field devices were used in process control systems to send and receive analog (e.g., 4 to 20 milliamp) signals to and from the process controller via an analog bus or analog lines. However, these 4 to 20 ma signals are limited in nature in that they are indicative of process measurements made by the device or of process control signals generated by the controller required to control the operation of the device during runtime. As a result, the conventional 4–20 ma devices are incapable of generating alarms pertaining to the operational capability of the device itself. As a result, alarms associated with these devices have generally not been available within process control systems. However, in the past decade or so, smart field devices including a microprocessor and a memory have become prevalent in the process control industry. A number of standard and open smart device communication protocols such as the Foundation™ Fieldbus (hereinafter "Fieldbus"), HART®, PROFIBUS®, WORLDFIP®, Device-Net®, and CAN protocols, have been developed to enable smart field devices made by different manufacturers to be used together within the same process control network. In addition to performing a primary function within the process, smart field devices may store data pertaining to the device, communicate with the controller and/or other devices in a digital or combined digital and analog format, and perform secondary tasks such as self-calibration, identification, diagnostics, etc. Importantly, the devices conforming to at least some of these protocols are capable of detecting problems within the device itself and of generating and sending alarms or alerts to indicate the detected problems to the appropriate operator, maintenance or engineer personnel associated with the process control system.

However, there has been few if any display applications for displaying non-process alarms, such as alarms generated by the field devices or controllers indicating some problem with the hardware associated with those devices has occurred. It is believed that there are no known displays which enable maintenance or engineer personnel to detect and attend to faulty field devices, controllers, I/O devices, etc. in a coherent or consistent manner, as there are with operator displays that display process alarms. In fact, engineers and technical personnel generally have to review numerous log printouts or stored files for alarms or other events detected about or by field devices or other hardware devices. This process is time consuming and difficult. The capability of enabling the engineer or maintenance person to view device and hardware alarms in a coherent manner is even more desirable with the advent of newer smart field devices, controllers and I/O devices which, as indicated above, are being provided with the ability to detect numerous operating problems about the devices themselves, such as when the device stops communicating, or some other problem that prevents the device from operating correctly. For example, a valve may have sensors on board that detect an overpressure or an underpressure condition, a stuck valve plug, etc. and software within the device may generate an alarm indicating the type of detected problem as well as the severity of the problem. In some cases, the problem may be critical and may need immediate attention, such as with a stuck valve plug, whereas other conditions may call for scheduling maintenance at some time in the future. For example, a valve may measure aggregate valve travel since the last maintenance and, when the aggregate valve travel reaches a predetermined threshold, may generate an alarm calling for maintenance.

Still further, in some smaller process environments, a single person may want to perform the functions of an operator, a maintenance person and an engineer. Alternatively, the operator may wish to know about problems occurring in field devices, controllers and I/O devices, because it may help him or her to make sense of some of the process alarms that appear on the traditional operator interface. In the past, there has been no easy way of enabling a single person to view all of the alarm data in an organized and integrated manner. Still further, an operator may wish to view all categories of alarms unless too much information is being displayed on the interface, at which time the operator may wish to turn certain categories of alarms off or hand the responsibility for certain alarms to someone else. Currently, there is no system which enables a single person to perform these functions.

SUMMARY OF THE INVENTION

An alarm display and interface system for use in a process control network receives and displays different categories of alarms, including for example, device alarms and hardware alarms as well as traditional process alarms, on a single display in an integrated manner to enable an operator or other user to view, have access to and manipulate the alarms of different categories. The display and interface system may be used to filter the alarms that are displayed according to any number of parameters, including category, type, priority, status, time, etc. so as to alternatively segregate or combine the tasks typically associated with operator, maintenance and engineer personnel. The alarm display and interface system may also be used to access each of the displayed alarms to obtain more information about any individual alarm.

According to one aspect of the present invention, an alarm display system is capable of being used in a process control network having a user interface with a display mechanism and a multiplicity of communicatively interconnected devices adapted to generate and send alarm messages containing alarms of various categories to the user interface. The alarm display system includes an alarm receiver configured to receive the alarm messages from the multiplicity of devices to obtain a plurality of alarms of various categories, an alarm processing unit that processes the plurality of alarms for display based on a predetermined criterion to ascertain a set of alarms for display and an alarm display unit that presents indications of the set of the alarms for display on the display mechanism, wherein the alarm display unit presents the indications of alarms of various categories in an integrated manner on the display mechanism. If desired, the alarm processing unit may include an alarm filter that filters the plurality of alarms for display based on the predetermined criterion, such as alarm category or alarm priority, to ascertain the set of alarms for display.

BRIEF DESCRIPTION OF THE DRAWINGS

FIG. 5 is an example alarm banner display for a process alarm;

FIG. 6 is an example alarm banner display for a device alarm;

FIG. 7 is an example alarm banner display for a hardware alarm;

FIG. 12 is a first example alarm summary display created by an alarm summary control module;

FIG. 13 is a second example alarm summary display created by an alarm summary control module;

FIG. 14 is a third example alarm summary display created by an alarm summary control module; and FIG. 15 is an example event chronicle for process and device alarms.

DESCRIPTION OF THE PREFERRED EMBODIMENTS

Figure 1:
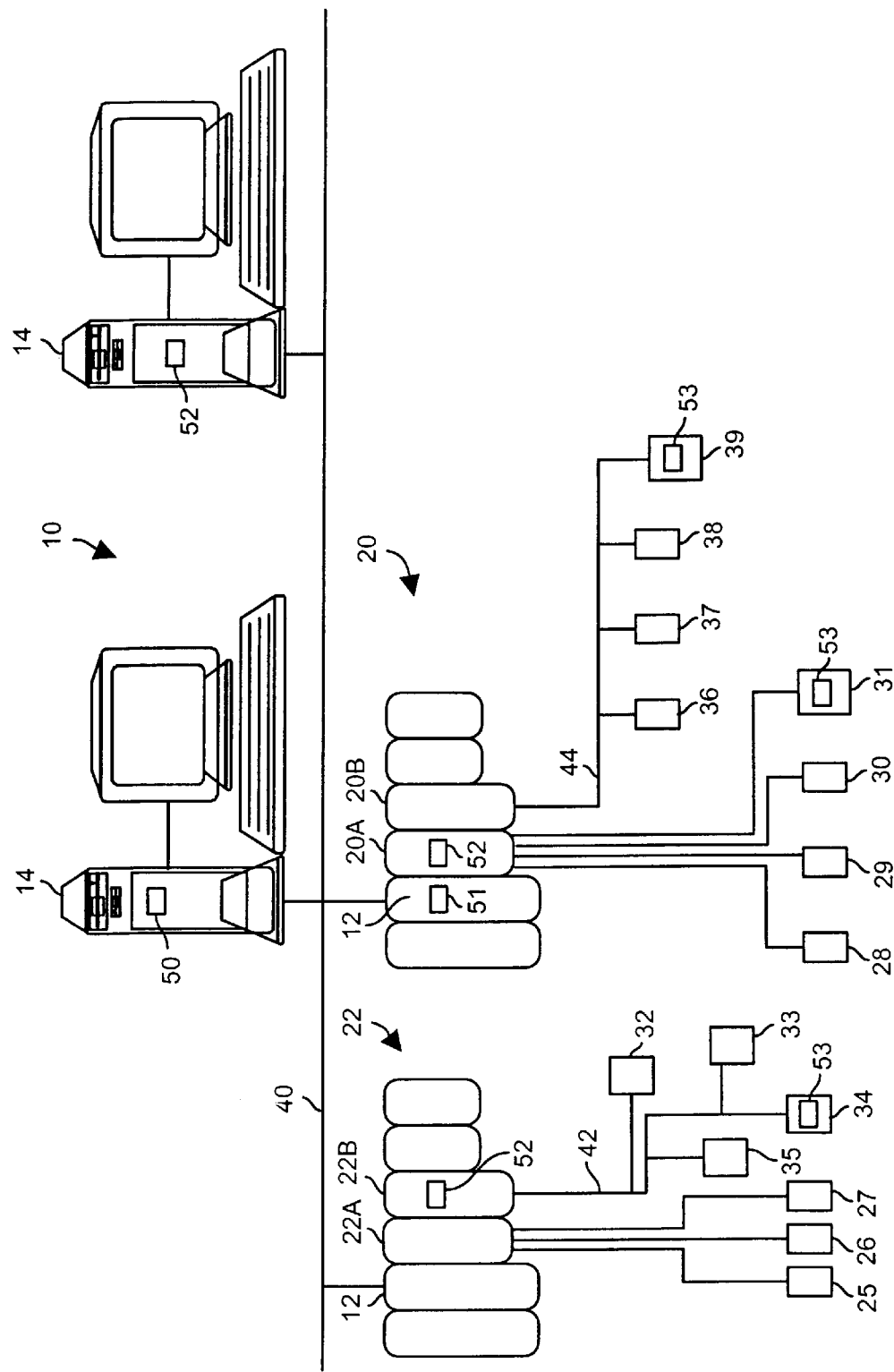
FIG. 1 is a block diagram of a process control system in which an integrated alarm display and interface system can be used.

Referring now to FIG. 1, a process control network or system 10 includes one or more process controllers 12 connected to one or more host workstations or computers 14 (which may be any type of personal computer or workstation) and connected to banks of input/output (I/O) devices 20, 22 each of which, in turn, is connected to one or more field devices 25–39. The controllers 12, which may be, by way of example only, DeltaV™ controllers sold by Fisher-Rosemount Systems, Inc., are communicatively connected to the host computers 14 via, for example, an Ethernet connection 40 or other communication link. Likewise, the controllers 12 are communicatively connected to the field devices 25–39 using any desired hardware and software associated with, for example, standard 4–20 ma devices and/or any smart communication protocol such as the Fieldbus or HART protocols. As is generally known, the controllers 12 implement or oversee process control routines stored therein or otherwise associated therewith and communicate with the devices 25–39 to control a process in any desired manner.

The field devices 25–39 may be any types of devices, such as sensors, valves, transmitters, positioners, etc. while the I/O cards within the banks 20 and 22 may be any types of I/O devices conforming to any desired communication or controller protocol such as HART, Fieldbus, Profibus, etc. In the embodiment illustrated in FIG. 1, the field devices 25–27 are standard 4–20 ma devices that communicate over analog lines to the I/O card 22A. The field devices 28–31 are illustrated as HART devices connected to a HART compatible I/O device 20A. Similarly, the field devices 32–39 are smart devices, such as Fieldbus field devices, that communicate over digital bus 42 or 44 to the I/O cards 20B or 22B using, for example, Fieldbus protocol communications. Of course, the field devices 25–39 and the banks of I/O cards 20 and 22 could conform to any other desired standard(s) or protocols besides the 4–20 ma, HART or Fieldbus protocols, including any standards or protocols developed in the future.

Each of the controllers 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course hybrid and other types of function blocks exist. Groups of these function blocks are called modules. Function blocks and modules may be stored in and executed by the controller 12, which is typically the case when these function blocks are used for, or are associated with standard 4–20 ma devices and some types of smartfield devices, or may be stored in and implemented by the field devices themselves, which may be the case with Fieldbus devices. While the description of the control system is provided herein using function block control strategy, the control strategy could also be implemented or designed using other conventions, such as ladder logic, sequential flow charts, etc. and using any desired proprietary or non-proprietary programming language.

Figure 3:
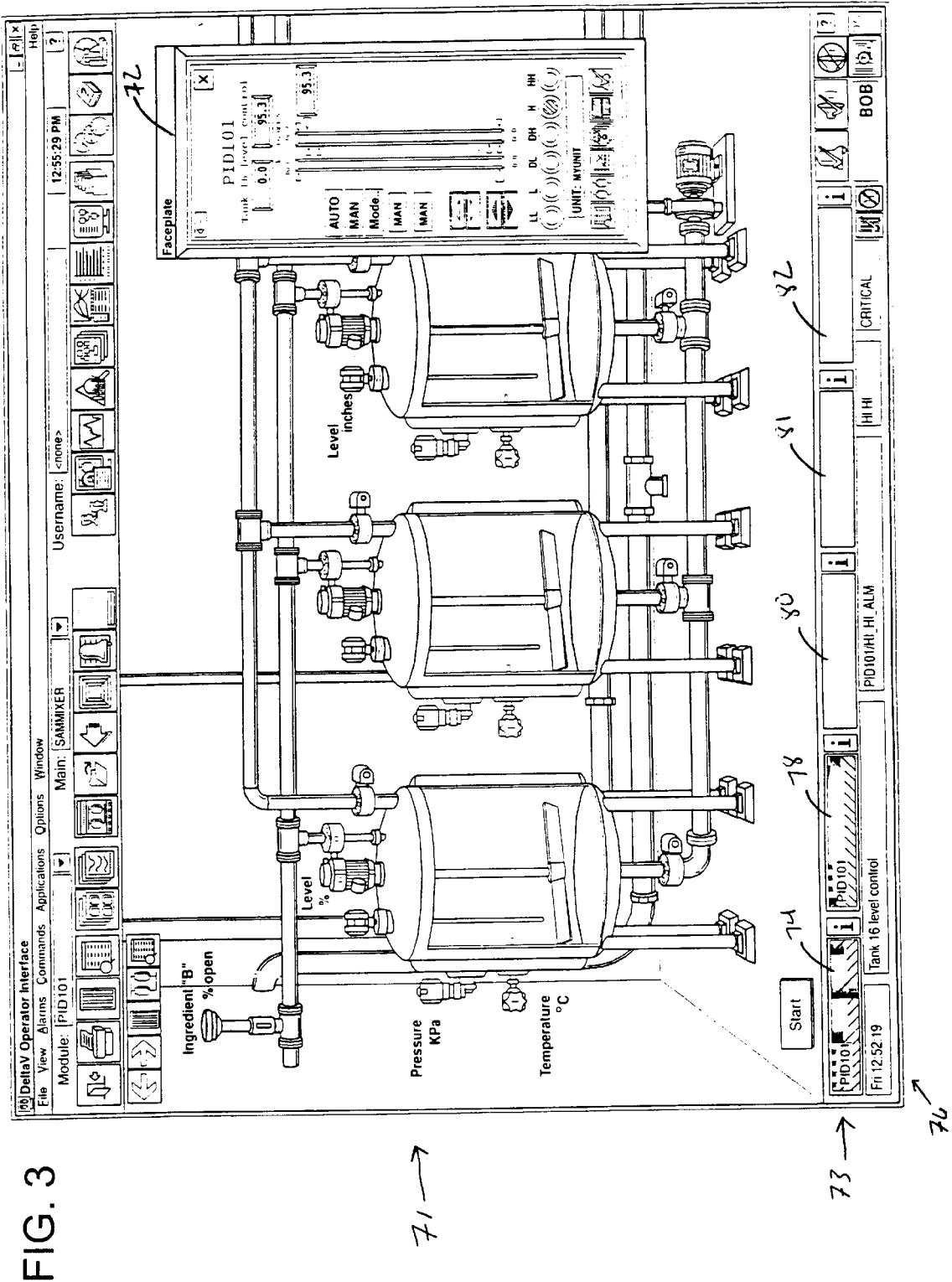
FIG. 3 is a first example user interface screen generated by the integrated alarm display and interface system used in the process control system of FIG. 1.

In the system of FIG. 1, one or more of the host devices 14 serves as an operator workstation and has alarm processing software 50 stored therein. Generally speaking, the alarm processing software 50 displays information about the process control system 10 pertinent to the operator's understanding or ability to view the current operational status of the process with respect to the alarms present in the system. For example, the alarm interface software 50 may display an alarm banner having alarm indications therein and a primary control display illustrating a section of the process 10, including the devices and other equipment associated with that section of the process 10 relevant to one of the alarms. The primary control display may provide information about the current state of the process 10, such as the level of fluid in tanks, the flow characteristics of valves and other fluid lines, the settings of equipment, the readings of sensors, etc. An example of such a display is illustrated in FIG. 3. An operator may use the alarm processing software 50 to view different parts of or equipment within the process 10. Of course, the alarm processing software 50 communicates with the controllers 12 and, if necessary, the field devices 25–39, any of the banks of I/O devices 20, 22 or other devices to obtain the relevant values, settings and measurements associated with or being made in the process 10 to create the interface screen on the operator display of the workstation 14.

The alarm processing software 50 is configured to receive alarms created by alarm generating software within some or all of the controllers 12, the I/O devices 20 and 22 or the field devices 25–39. This software is illustrated as software elements 51, 52 and 53 in FIG. 1. Generally speaking, the interface software 50 receives different categories of alarms including, for example, process alarms (which are typically generated by a process control software modules, such as those made up of communicatively interconnected function blocks, forming process control routines used during runtime of the process), hardware alarms, such as alarms generated by the controllers 12, I/O devices 20 and 22 or other workstations 14, pertaining to the state or functioning condition of these devices, and device alarms, which are generated by some or all of the field devices 25–39 to indicate problems associated with those devices. These or other categories of alarms may be generated in any desired manner. For example, it is already known to have the function blocks or software modules that are used to implement process control functions generate process alarms, and these process alarms are typically sent to operator interfaces for display. Also, newer smart devices, controllers, I/O devices, databases, servers, workstations, etc. may use any desired, proprietary or non-proprietary software to detect problems, errors, maintenance alerts, etc. and to send alarms indicating these conditions to the operator interface 14. In particular, many of the devices now available, such as the controllers, I/O devices and smart field devices are provided with software and/or sensors that detect hardware problems, such as stuck valve plugs, broken parts, maintenance concerns, etc. and that generate signals or messages indicting these conditions. This capability is already provided in many devices, including field devices, I/O devices and controllers and so, will not be described in detail herein. It is sufficient to say that any desired error detection and alarm generating software 51, 52 and 53 may be used to send alarms to the alarm processing software 50, which is configured to receive and recognize these alarms using any desired protocol or communication strategy.

If desired, the alarm processing software 50 may receive and filter alarms based on a number of factors. In particular, the alarm processing software 50 may filter alarms based on the workstation in which the software 50 is run, the operator or person logged into the workstation and operator configurable settings, such as category, type, priority, status, time of generation, etc. of the alarm. For example, the software 50 may filter the alarms to display alarms only from the areas or sections of the plants to which the workstation on which the software 50 is run is configured to receive. That is, alarms for certain areas or sections of the plant may not be displayed at certain workstations but, instead, each workstation may be limited to displaying alarms for one or more specific areas of the plant. Likewise, alarms may be filtered by operator identification. In particular, operators may limited to viewing certain category, type, priority, etc. alarms or may be limited to viewing alarms from a section or subsection (e.g., and area) of the plant. The processing software 50 also filters out alarms for display based on the operator's clearance. These workstation and operator filtering settings are referred to herein as the workstation and operator scope controls.

The alarm processing software 50 may also filter the viewable alarms (i.e., those within the workstation and operator scope controls) based on operator configurable settings including, for example, the category of alarm (e.g., process, device or hardware alarm), types of alarms (communication, failure, advisory, maintenance, etc.), the priority of the alarm, the module, device, hardware, node or area to which the alarm pertains, whether the alarm has been acknowledged or suppressed, whether the alarm is active, etc.

Figure 2:
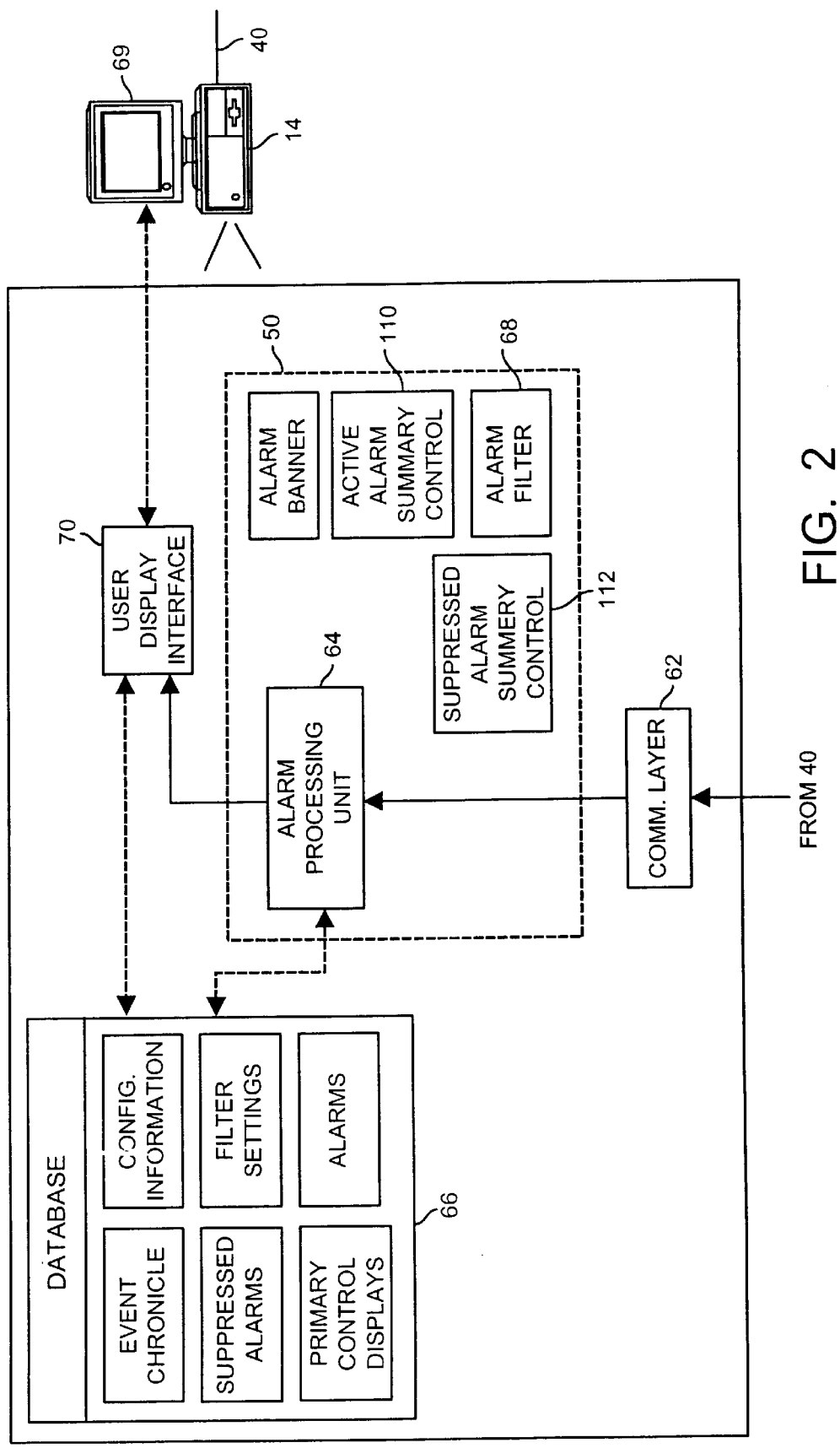
FIG. 2 is a block diagram of a workstation having an integrated alarm display and interface system executed therein.

Referring now to FIG. 2, the configuration of one of the workstations 14 which implements the alarm display and interface system is illustrated in more detail. As illustrated in FIG. 2, the workstation 14 stores and executes communication software, such as a communication layer or stack 62, that communicates with the controllers 12 via the Ethernet connection 40 to receive signals sent by the controllers 12, I/O devices within the banks 20 and 22, field devices 25–39 and/or other workstations 14. The communication layer 62 also properly formats messages to be sent to the controllers, devices, field devices 25–39 and other workstations 14 such as alarm acknowledgment signals, etc. This communication software can be any known or desired communication software which is currently used with, for example, Ethernet communications. Of course, the communication stack 62 is coupled to other software which performs other functions, such as configuration applications, diagnostic or other process applications, database management applications, etc. run within the workstation 14.

The alarm display and interface system includes an alarm processing unit 64 which receives alarms from the communication layer 62, decodes those alarms and may store the decoded alarms in a database 66. The front end of the alarm processing unit which interfaces with the communication layer 62 or the database 66 may be an alarm receiver, as can be the communication layer 62. The alarm display and interface software 50 also includes a filter 68 which the alarm processing unit 64 uses to determine which alarms are to be displayed on a user interface 69 (such as a CRT, LCD, LED, plasma display, printer, etc.) associated with the workstation 14. The filter 68 may have its settings stored in the database 66 and these filter settings may be preconfigured and/or may be changeable by a user based on the user's preferences.

Generally, the filter settings may control the category and priority of alarms and, if desired, may establish the order of the alarms to be displayed using a number of different criteria. First of all, the workstation and operator scope controls effect what a particular operator can see (which alarms can be displayed at a particular workstation) based on the operator identification and workstation to which the operator is logged on. In this case, an operations license may be assigned to each workstation and, without an operations license, the alarm information and all alarm list/summary displays will be empty, i.e., no active or suppressed alarms of any category (process, hardware, or device) will be shown by the alarm processing unit 54. Still further, only alarms from a plant area in the current operator's scope (the operator is usually given at least one security key in the plant area) are eligible to appear in the alarm displays on that workstation. Also, only alarms from a plant area and unit which has not been "turned off" using the plant area or unit filtering display(s) (to be discussed below) are eligible to appear in the alarm display. In this manner, the filter 68 first prevents the display of alarms outside of the workstation and operator scope and alarms from plant areas or units that have been turned off by the operator.

After testing alarms for conformance to the workstation and operator scope controls, the filter 68 then filters out and determines the display order of alarms based on operator settings, which may include, for example, the category of alarm, the priority of the alarm, the type of alarm, the acknowledged status of the alarm, the suppressed status of the alarm, the time of the alarm, the active status of the alarm etc. The received alarms, which are sent to the software 50 using alarm messages, will including a parameter for each of these values and the filter will filter alarms for display by comparing the appropriate parameters of the alarms to the filter settings. For example, the operator can indicate which categories of alarms and priority levels of alarm should be displayed on the screen. If desired, the operator can adjust a predetermined priority level for an alarm by offsetting the priority level from the preconfigured priority level for the alarm, as set by the manufacturer. In the DeltaV system, a priority level between 15 and 3 is chosen for each alarm and the operator can offset this priority by any number of levels thereby make a higher priority a lower priority (or vise versa) when viewed by the filter 68. While the operator may set the order of display of the alarms which are passed by the filter 68, the order may also be determined by preconfigured settings, which leads to a more consistent display of the different alarms.

In any event, the operator can customize the manner in which alarms are displayed based on categories of alarms that the operator or user is most interested in, which could be all of one category of alarm such as process alarms, device alarms, or hardware alarms or a combination of two or more categories of alarms. The user may also have control over how the alarms are presented and the information provided with the alarms. In this manner, the alarm display and interface software 50 can be used to enable a single person to perform the operations of an operator, a technician or maintenance person and an engineer by viewing and addressing on the same screen, the alarms that would normally be addressed by those different personnel at different locations in a plant. Alternatively, at different times in the same system, the maintenance person can use the same system to view just the maintenance alarms while an engineer can view other types of alarms that are effecting the devices. In this manner, the same alarm display and interface software 50 can be used by different types of people at the same time (in different workstations) to view different aspects of the alarms associated of the operational functions of the process control system 10. Furthermore, using the alarm display and interface software 50, it is easy for certain individuals to turn over alarm functions that they are viewing and acknowledging to other individuals who may have the same software and can, at the same time, set their filter to accept alarms that were normally viewed by the first person. In this manner, one person can go to lunch and turn the alarm viewing function over to other persons at a different workstation by resetting a few filter settings. When returning from lunch, that person can take over those functions once again. Also when the alarm information becomes too great for one person to handle, this person can hand off or shed the load for certain categories of alarms such as process alarms, device alarms or hardware alarms so that these alarms can be handled by other people at other terminals.

After the alarm processing unit 64 uses the filter 68 to decide which alarm(s) should be displayed to the user via the display 69 and the order in which the alarms should be displayed, the alarm processing unit 64 provides this information to a user display interface 70 which uses any standard or desired operating system to display alarm information on the alarm display 69 in any desired manner. Of course, the user display interface 70 obtains other information it needs, such as information about the layout of or configuration of the process control system 10, the values of parameters or signals within that system, etc. from the database 66 or from other communication signals received from the process control network 10 via the communication layer 62. Also, the user display interface 70 receives commands from the user requesting, for example, more information on particular alarms, changes to alarm or filter settings, new alarm displays, etc. and provides this information to the processing unit 64 which then takes the requested action, searches the database for the alarm information, etc. to provide a new alarm view to the user via the display 69.

Generally speaking, there are different categories of alarms that can be generated and displayed on the display 69 including, for example, process alarms, device alarms and hardware alarms. Process alarms, which are known and which are typically generated by function blocks or modules within a process control routine running on a controller or a field device, have, in the past, been sent to and displayed on an operator interface. Process alarms generally indicate a problem with the functional operation of the process control software, i.e., a problem with the process control routine itself such as out of bound measurement, abnormal variances between process parameters, and set points, etc. Process alarms are typically configured as components of process control modules and may appear in the configuration information provided on the operator interface as being associated with a module name. Some kinds or types of process alarms include bad input/output, out of bound measurements, exceeded thresholds, etc. Because process alarms are known in the art, they will not be described in more detail herein.

Device alarms are alarms associated with operation of the field devices within the process and may be detected by software (e.g., the software 53 in FIG. 1) within the field devices or other devices connected within the process to indicate a problem or error with the operation of a field device. Device alarms may appear in the operator interface of the system described herein as being associated with a particular device. Device alarms may, for example, indicate that the pressure in a valve is to great or to small for proper operation of the valve, that the motor current in the valve is to high or to low, that the voltage levels of a device are out of synch, that a valve plug within a valve is stuck, that the device is not communicating properly, that the device needs scheduled maintenance because, for example, a certain amount of time has passed or because a valve member of the device has undergone a certain amount of travel since the last maintenance, etc. Device alarms can be generated in any desired manner, including with the use of proprietary or non-proprietary software located on a device itself or in other devices connected to the device for which the alarm is being generated to recognize and detect specific problems with the device and to generate an alarm with respect thereto. As indicated above, many smart devices are now being produced to create and communicate device alarms.

There can be, of course, many different specific types or kinds of device alarms including, for example, failure alarms indicating that a failed or failing condition exists within a device, maintenance alarms indicating that maintenance of some sort should take place, communication alarms indicating that the device has stopped communicating properly or at all, advisory alarms, etc. A failure (e.g., a "failed") alarm indicates that the device has detected condition(s) that indicate that it cannot perform a critical function and thus requires maintenance immediately. Whenever the failed alarm condition is true, the integrity of the device is considered bad (and thus rolls up causing the integrity of the controller node to which the device is connected to be bad). A maintenance alarm indicates that the device is able to perform critical functions, but has detected condition(s) that may lead to a failure if left unaddressed and thus, the device should receive maintenance attention soon. A communication (e.g., a "not communicating") alarm becomes active when a device stops communicating. Whenever the not communicating alarm condition is true, the integrity of the device is considered bad (and thus rolls up causing the integrity of the controller node to which the device is connected to be bad). An advisory alarm indicates that the device has detected conditions that do not fall into the other categories. Usually, an advisory alarm is an alarm provided by individual devices particular to the type of device, such as a flow meter tracking the variability of the flow signal. In this case, the device may recognize that a variability in some signal associated with the device is too high or too low, which means that something unusual has happened and requires some investigation. Depending on the device, advisory alarms may require more or less urgent attention than maintenance alarms and thus, users would probably set the priority of the advisory alarm lower than that of the maintenance alarm. Of course, failed, maintenance and advisory alarms may not be supported by every device and a single, catch all alarm, such as an "abnormal" alarm for generic devices may be used instead of the failed, maintenance, and advisory alarms resulting in two total alarms, i.e., not communicating and abnormal. Of course, other types of device alarms could be created or used instead of or in addition to the ones discussed above.

Of course, the problem which causes some of the device alarms, such as communication alarms and failure alarms, may also cause one or more process alarms to be generated by the process control software. In particular, a communication alarm indicates that the communication connection with the device is broken and thus, the process controller connected to the device does not know what is happening within the device. As a result, process control software, such as function blocks, expecting information from the device may generate process alarms indicating that the process loop is faulty.

Generally speaking, hardware alarms are alarms that indicate problems with a workstation, database, controller, I/O device or other hardware device, besides a field device, used within a process control system. Hardware alarms may indicate, for example, I/O outages or devices reporting problems with communication integrity. In particular, hardware alarms are used to alert users to failures of hardware components of the system and may appear in the operator interface as being associated with a node in which the failure was detected. Because hardware alarms may be used to notify operators and maintenance personnel of hardware failures within a node, hardware alarms augment known node integrity reporting systems. For example, if an eight channel I/O card goes dead, software (e.g., the software 51 or 52 of FIG. 1) within the controller attached to the I/O device may report the I/O card failure as a hardware alarm. This is different from the past in which the operator may have had to deduce a failure of an I/O card based solely on the generation of a number of process alarms caused by the disruption in the process control routines being performed using the faulty I/O card.

In on embodiment, each hardware component may generate two types of hardware alarms, including a "not communicating" alarm and a "failed" alarm. The not communicating alarm is generated when a device is not communicating. This alarm may the device having communication problems or be generated by another device which expects communication from the device for which the alarm is generated and does not receive the communication after a time-out period, or by a device that polls the failed device for communication but does not receive an answer. On the other hand, the failed alarm may become active when the component is communicating, but has detected one or more failures within the component (e.g. a failed channel in an I/O card). Failed alarms may be different based on the type of hardware device to which the alarm pertains. For example, for controllers, a failed alarm condition may result from a standby controller not being able to accept a switchover (for a longer period than the normal synchronization time), or when the controller has no configuration. For local application stations, a failed alarm condition may result from the application station having no configuration. For conventional I/O cards, a failed alarm condition may result from a failed channel, a standby not accepting a switchover (for a longer period than the normal synchronization time), etc. For AS Interface I/O cards, a failed alarm may result from a failed port, a port-device communication failure, a port-device abnormal status, a not accepting a switchover (for a longer period than the normal synchronization time). For Fieldbus H1, Profibus I/O and Serial I/O cards and the like, a failed alarm may indicate that a specific port has failed, that there is a port-device communication failure, that there is a port-device abnormal status, that a standby card is not operating properly, etc.

Because hardware failures can also result in device alarms and process alarms, the effective priority of all device alarms for all devices communicating through a hardware component undergoing a failure can be forced to a low priority level such as 3 by the alarm processing unit 64. This will effectively remove all device and process alarms from the user display for devices that are affected by this hardware failure (such as a port failure), until the hardware unit goes back to the communicating state.

As will be understood, device and hardware alarms are used to alert users to failures and other conditions detected in devices connected to the system, notably smart devices connected to controllers via various fieldbus technologies such as Fieldbus, HART, Profibus, etc. and other hardware, such as I/O devices, controllers, application workstations, etc. While the foregoing discussion describes the preferred user interface elements relating to device alarms and hardware alarms using Fieldbus device alerts/alarms, the expectation is that device and hardware alarms from other smart I/O and control systems could be used as well.

As noted above, the different categories of alarms, including process alarms, device alarms and hardware alarms, are sent to and received by the alarm interface software 50 for potential display on the display device 69 in some convenient message format. The actual alarms that are presented on the display device 69 are determined by the scope of access of the workstation and operator and by the filter settings of the filter 68 which can be configured to display alarms using any desired criteria, such as the category of alarm (e.g., process, device or hardware), the priority associated with the alarm, etc. Using this software, different categories of alarms are integrated on the same interface to provide an operator more information pertaining to the faulty operation of the process control system as opposed to the past, where an operator could only view process alarms and had to use these process alarms to determine if device or hardware failures might have occurred to cause the process alarms. With the integrated displays described herein, an operator can view actual device and hardware alarms on the same screen or display device as the process alarms, and can treat each of the alarms in the same manner, which enables the operator to determine more quickly and easily if one or more process alarms are really just a result of a faulty device or hardware, etc. Likewise, the user can interact with and deal with the device and hardware alarms in the same manner that the user deals with process alarms so that reacting to each of these categories of alarms requires the same types of user functions, which is more simple for the user.

There are of course, many ways in which the different categories of alarms may be displayed in an integrated manner on a user interface. A couple of these user displays are described herein. In one embodiment, the process, device and hardware alarms are treated similar to the way in which process alarms have traditionally been treated on a display. As a result, an operator can acknowledge or suppress device and hardware alarms in the same way the process alarms are acknowledged or suppressed. Likewise, device and hardware alarms may be displayed in a manner that indicates the type, priority, name, section of the process, state, etc. of the alarm. Also, a primary control display associated with an alarm may be presented to the user, with the primary control display being a display to that is made to help the user understand or see the source of the alarm or functionality of the hardware or software element associated with the alarm, such as the module, process loop, device, node, area, etc. for which the alarm was generated or with which the alarm is associated. A primary control display may be, for example, a physical picture of a device, a digital picture or drawing of the room or the area in which a device is located, other information associated with the device such as part of a plant drawing, schematic or conception drawing illustrating the connections between the device in the plant during implementation, etc. Primary control displays for alarms can be created by users and may, for example, be oriented to modules (for process alarms), to devices (for device alarms) and to nodes (for hardware alarms) or to areas or sections of the plant associated with the alarm. The primary control displays may be geared to different functions also. For example, process alarm primary control displays may be oriented to process operation functions, device alarm primary control displays may be oriented to field device maintenance functions and hardware primary control displays may be oriented to node maintenance functions. Primary control displays for hardware alarms may be, for example, pictures of where the controller is located, schematics of the controller's I/O hardware with all hardware alarm statuses indicated, buttons to navigate to the unit overview or primary control displays that a controller is supporting, maintenance procedure checklists, etc. Likewise, primary control displays for device alarms can be created by users and may, for example, be oriented to device maintenance functions. The primary control displays may be stored in the database 66 (FIG. 2) and be accessed and presented on the display 69 when an alarm using that primary control display is selected. Of course, the same or different primary control displays may be used for different alarms and primary control displays.

In one embodiment, the integrated alarm information is provided to a user on a display in the form of an alarm banner at, for example, an edge of a display screen. Referring now to FIG. 3, an alarm banner 73 is located on the bottom of a screen 71. The alarm banner 73 includes a first line that displays indications of various alarms that have been generated by the process control system 10 and that have passed through to the display by the filter 68. At least one of the alarms indicated in the alarm banner 73 may be associated with the portion of the process control system 10 depicted in the main part of the screen 71. The specific alarms displayed in the alarm banner 73 and the order of these alarms are determined according to the filter settings of the filter 68. Generally speaking, the highest priority alarms which have not been acknowledged or suppressed will be displayed first, with the next highest priority arms being displayed next, and so on. In the example screen of FIG. 3, the highest priority alarm 74 is a process alarm illustrated as being associated with a PID101 control routine. The alarm 74 is displayed in red to illustrate that its priority is critical. On the second line of the alarm banner 73, an alarm information field 76 displays alarm information associated with the alarm in the alarm banner 73 that is currently selected. In the example of FIG. 3, wherein the alarm 74 is selected, the alarm information field 76 illustrates that the alarm 74 was generated on Friday at 12:52:19, is associated with the "tank 16 level control," has a designation or name of PID101/HI_HI_ALM, has a high, high priority and is a critical alarm. If the alarm 74 is flashing, this means that the alarm is not acknowledged, while a constant (non-flashing) alarm indication in the alarm banner 73 means that the alarm has been acknowledged by some operator or user. Of course, other types of alarm information could be displayed on the alarm information field 76.

Also, the other alarm indications in the alarm banner 73, such as the alarm indication 78, could be other colors like yellow, purple, etc. to indicate other levels of seriousness or priority associated with the alarm. When another alarm is selected, such as the alarm 78, 80, 81 or 82, alarm information pertaining, to that alarm would be displayed in the alarm information field 76. Viewing an alarm in the alarm banner 73, the operator can acknowledge the alarms and alert the maintenance or engineer personnel to take the appropriate actions to correct the condition which led to the alarm or, alternatively, could take other steps within the process control systems such as resetting certain set points to alleviate the alarm condition. When used to display only process alarms, the display of FIG. 3 is similar to a known operator display now provided in the Delta-V control system.

As indicated above, by selecting one of the alarms in the alarm banner 73 (such as the alarm 74), a primary control display for that alarm is presented in the screen 71. In particular, as shown in FIG. 3, the main body of the screen 71 includes a primary control display or depiction of pertinent hardware associated with a particular alarm (a selected alarm) within the process control system 10. In the example of FIG. 3, the hardware includes three tanks interconnected by various valves and fluid flow lines along with various sensors attached thereto. This hardware depiction is a representation of the equipment within a portion of the process 10 and provides certain information about operation of some of the equipment, such as certain values or parameters associated with the tanks, sensors etc. Of course, some of this information may be provided by a configuration information in the database 66 and signals from the sensors in the process control system via the controllers 12 and Ethernet connection 40. In this case, such information is sent up through the communication layer 62 and is provided to the user display interface 70 via any known or desired software.

Also, as illustrated in FIG. 3, a face plate 72 depicting a "virtual instrument" for a PID control unit (module) is illustrated as additional information for one of the alarms (in this case, the process alarm 74) within the alarm banner. The face plate 72 provides further information pertinent to the selected process alarm and identifies the name of the control unit (the module PID101) and certain settings or parameters associated with that module. The generation of such a pictorial description of the process is now used for process control alarms and is known in the art and thus, will not be described in detail. Suffice to say that this or any other desired pictorial or non-pictorial description of part of or the entirety of the process control system 10 may be displayed on the screen 71 to enable a user, such as an operator, to view the operational functions or hardware functions of any part of the process control system 10. The displays, of course, may depict or otherwise represent individual hardware units, related groups of hardware, block diagrams or other diagrams of portions or areas of plants, etc.

While, in the past, displays such as the display of FIG. 3 have been able to display process alarms and were used by operators to view process alarms, i.e., alarms associated with the software (such as function blocks) controlling the process operation, the alarm display and interface software 50 provides information about other categories of alarms including device and hardware alarms in conjunction with process alarms, if the operator has set the filter 68 to view such alarms.

Figure 4:
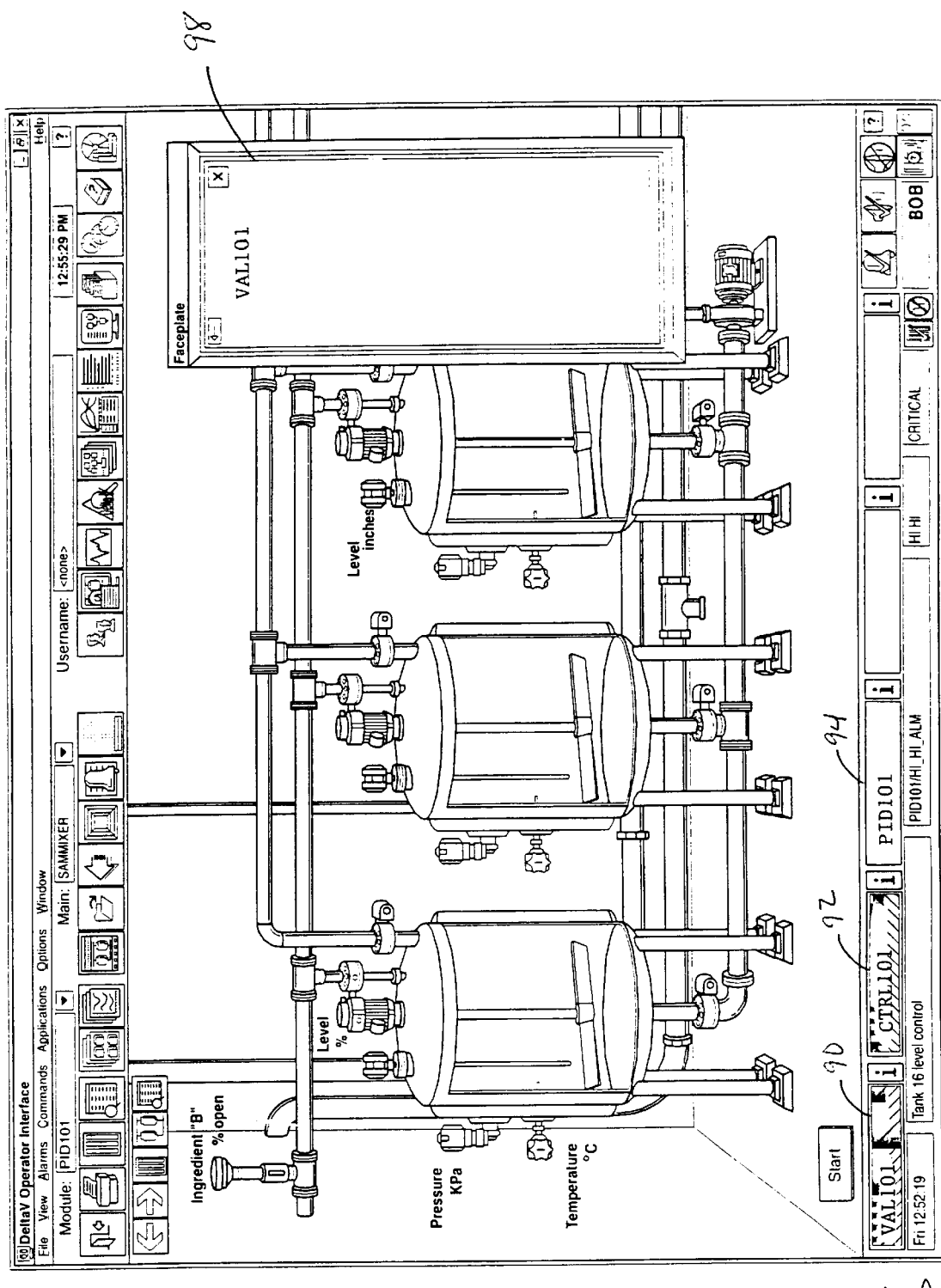
FIG. 4 is a second example user interface screen generated by the integrated alarm display and interface system used in the process control system of FIG. 1.

Referring now to FIG. 4, a further integrated alarm display having various categories of alarms presented on the alarm banner 73 is illustrated. In particular, in FIG. 4, the first and highest priority alarm 90 is a device alarm associated with a valve, the second highest priority alarm 92 is a hardware alarm associated with a controller and the third alarm 94 is a process alarm associated with the process control module PID 101. The alarm information for the device alarm 90, which is selected in FIG. 4, is illustrated in the alarm information field 76. The information for the device alarm 92 includes information pertaining to the time at which the alarm was generated, the priority and name of the device along with a information about the criticality and priority of the alarm. Likewise, the primary control display for the valve is illustrated on the screen 71 (which, incidentally is the same primary control display as the process alarm 74 of FIG. 3). Also, a face plate 98 for the valve is illustrated. The face plate 98 is one designed for a deice alarm and will be discussed in more detail with respect to FIGS. 8 and 9.

An example, alarm banner information display for a process alarm is illustrated in FIG. 5 and this alarm banner information is similar to that which has been provided for process alarms in the past. An example alarm banner information display for a device alarm (FV-101) including the alarm information field therefor is illustrated in FIG. 6. In this display, "FV-101" is a user configured name of the device; "Reactor 1 inlet valve" is a user configured description associated with the device; and "FAIL_ALM" is a non-configurable name of the device alarm parameter. The alarm parameter names may be, for example, COMM_ALM for "not communicating" device alarms, FAIL_ALM for "failed" device alarms, MAINT_ALM for "maintenance" device alarms and ADVISE_ALM for "advisory" device alarms. Also, in FIG. 6, "FAILED" is the non-configurable alarm word with a set of potential alarm words being COMM, FAILED, MAINT, and ADVISE. "CRITICAL" is the alarm priority word and "I/P Feedback limit: 103.47" is a non-configurable string that is determined based on the device, revision, and the information available from the device. For alarms detected from Foundation Fieldbus alert notification, the string would depend on the data from the alert message, and would optionally include one numeric "value" inserted appropriately in the string.

Because Foundation Fieldbus devices are not expected to report any other conditions contributing to an alarm while the first condition in the alarm is active, the message that appears in the alarm banner describes the first condition detected. The timestamp shown for the alarm (and that is used in ordering of alarms in alarm banner and alarm summary displays) is the time that the alarm first went to an active state.

Examples of typical types devices alarm messages are NVM write count limit: 100001: Output block time-out: Pressure derivative limit: pressure high limit: Pressure low limit: I/P Feedback limit: Temperature high limit: Temperature low limit: Travel deviation: 25.67 servo units: Travel high limit: Travel high-high limit: Travel low limit: Travel low-low limit: Travel accumulation limit: cycle count limit: Drive failure, etc.

Likewise, an example, alarm banner for a hardware alarm is illustrated in FIG. 7. In this display, "CTLR1" is a user configured name of the node; "Room 4, cab, 3, pos 2" is a user configured description associated with the node; and "CARD04_FAIL" is a non-configurable name of an alarm parameter. The alarm parameter names may be, for example, NODE_COMM for "not communicating" (standby) node hardware alarm, NODE_FAIL for "failed" (standby) node hardware alarm, CARDxx_COMM for I/O card "not communicating" hardware alarms, CARDxx_FAIL for I/O card "failed" hardware alarms, etc. Further, in FIG. 7, "FAILED" is the non-configurable alarm word with the potential alarm words being, for example, COMM for "not communicating" node or I/O card hardware alarms and FAILED for "failed" node or I/O card hardware alarms. "CRITICAL" is the alarm priority word and "Channel 7 failed" is a description determined based on the condition in the node or I/O card that is contributing to the alarm. The message that appears in the banner describes the last condition change (the condition either going active or inactive) detected while the alarm is in an active state. The timestamp shown for the alarm (which may be used in ordering of alarms in alarm banner and other alarm displays) is the time that the alarm first went to an active state.

From a view of FIGS. 5–7 it can be seen that the information presented in the alarm banner information portion is similar for each of the different categories of alarms which are being displayed or indicated on the user interface. Likewise, the alarm indications share the same display features such as blinking, color, etc. based on the priority, active, acknowledged status of the alarm, despite the category of the alarm. In this manner, alarms of different categories are integrated on the display screen, e.g., shown together and treated similarly based on the relevant parameters of the alarms.

Figure 8:
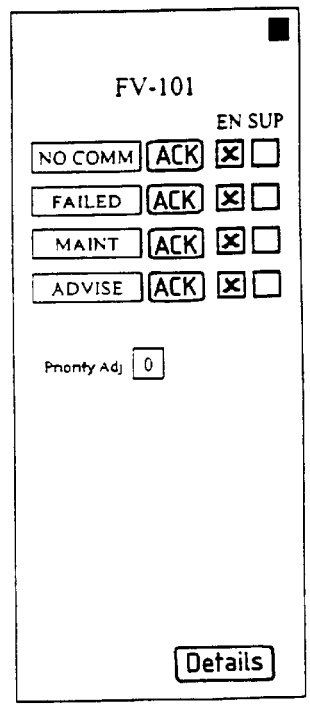
FIG. 8 is an example faceplate display for a device alarm associated with a Fieldbus field device.
Figure 9:
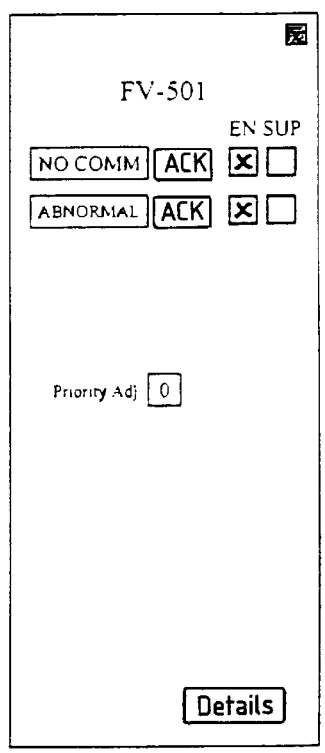
FIG. 9 is an example faceplate display for a device alarm associated with a generic field device.
Figure 10:
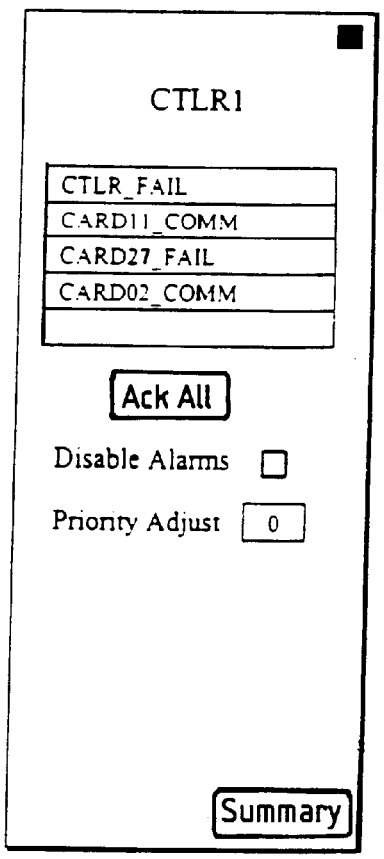
FIG. 10 is an example faceplate display for a hardware alarm associated with a node or a hardware element.

Referring now to FIGS. 8–10, example face plate displays for device and hardware alarms are illustrated. In particular, FIG. 8 depicts a face plate display for a device FV-101, illustrating the different alarm categories available for this device (in this case, NO COMM, FAILED, MAINT and ADVISE alarms). For each of these categories of alarms, an ack button (acknowledgment button) is provided, as is an enabled button (EN) and a suppressed button (SUP). Using these controls, the operator can acknowledge, enable (or disable) and suppress the different kinds of alarms for this device. Likewise, priority adjustment controls enable a user to adjust the priority of the alarms for this device. The Details button may be used to call up other applications which can be used to access this device or find out other information about the device. Any known prior art applications can be used for this purpose and these applications will not be described herein. Still further active alarms will be indicated using consistent color and blinking features, similar to the alarm indications in the alarm banner. FIG. 9 illustrates a primary control display for a generic device which has two categories of alarms, namely, a NO COMM and an ABNORMAL alarm.

If desired, using the alarm banner buttons to call up a primary control display for a device alarm will also bring up a face plate display such as that of FIG. 8 or 9 showing the most important active device alarms for that device. For example, up to a certain number, five, for example, most important device alarms in the device would be indicated, using consistent color and blinking as the representation in the alarm banner. It is also possible, using the displays of FIGS. 8 and 9 to acknowledge, disable, or adjust the effective priority of all the device alarms in the device. It is also possible to open a display showing a summary of all active device alarms in the device (discussed in more detail below).

Similarly, FIG. 10 illustrates an example face plate for a hardware device, in this case a controller named CTLR1. The face plate of FIG. 10 illustrates the different alarms available, such as CTRL_FAIL, CARD1_FAIL, etc. which indicate a portion of the node and the alarm category (failure or communication alarm). Again, if desired, the hardware face plate may show the most important active hardware alarms for that node. For example, up to a certain number, five, for example, most important hardware alarms in the node would be indicated, using consistent color and blinking as the representation in the alarm banner. It is possible, using the face plate display, to acknowledge, disable, or adjust the effective priority of all the hardware alarms in the node. It is also possible to open a display showing a summary of all active hardware alarms in the node by pressing the summary button on the face plate display of FIG. 10.

Generally speaking, in one embodiment such as that illustrated in FIGS. 3 and 4, the order that the alarm indications appear in the alarm banner 73 follows a set of ordering rules which may or may not be reconfigured or changed dynamically by a user. One example set of such rules is as follows. (1) Unacknowledged alarms appear before acknowledged alarms. (2) For alarms with the same acknowledgment status, alarms which are currently active appear before those which have cleared (before being acknowledged). (3) For alarms with the same acknowledgment and active status, alarms with higher priorities appear before alarms with lower priorities. (4) For alarms with the same acknowledgment, active status and priority, alarms which occurred more recently appear before those which occurred longer ago.

In one embodiment, different kinds of information may be available for display about each active alarm in the alarm information banner including, an alarm identifier ("<container name>/alarm parameter name"), a unit name, a time of occurrence, a description associated with the <container name>, an alarm word, and a priority word. The container name could be, for example, a module name for process alarms, a device name for device alarms and node name for hardware alarms.

Figure 11:
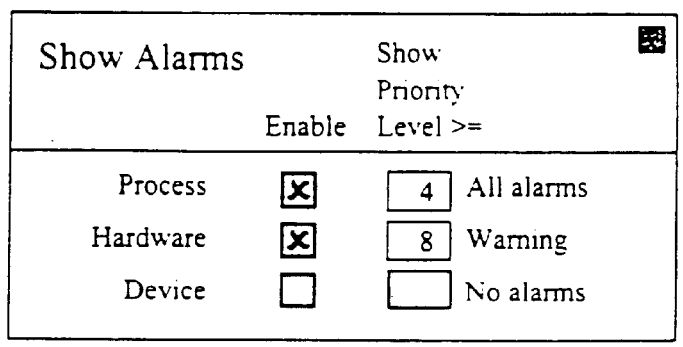
FIG. 11 is an example interface display for use in setting the categories and priorities of alarms to be displayed on a user interface screen.
Figure 2:
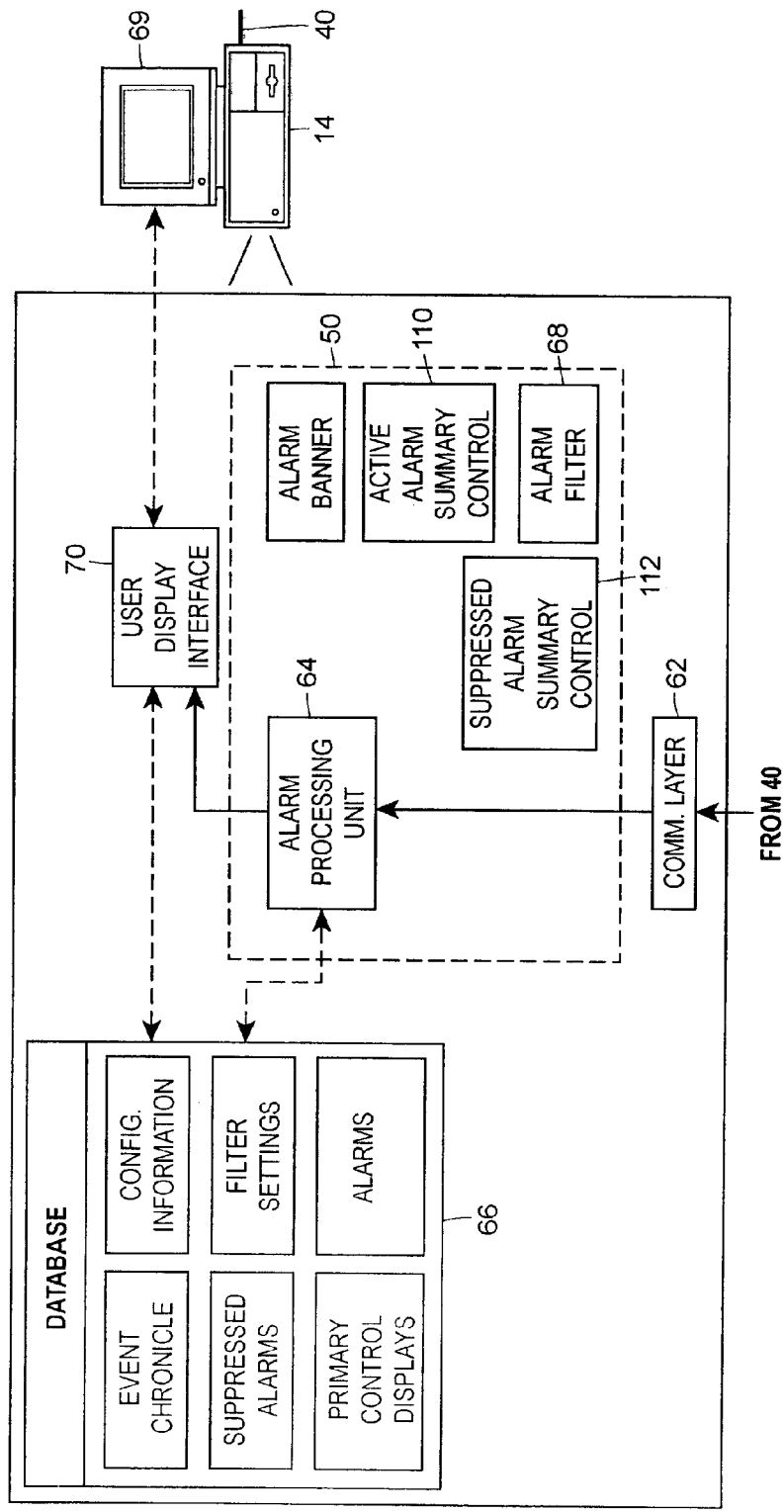
Figure 3:
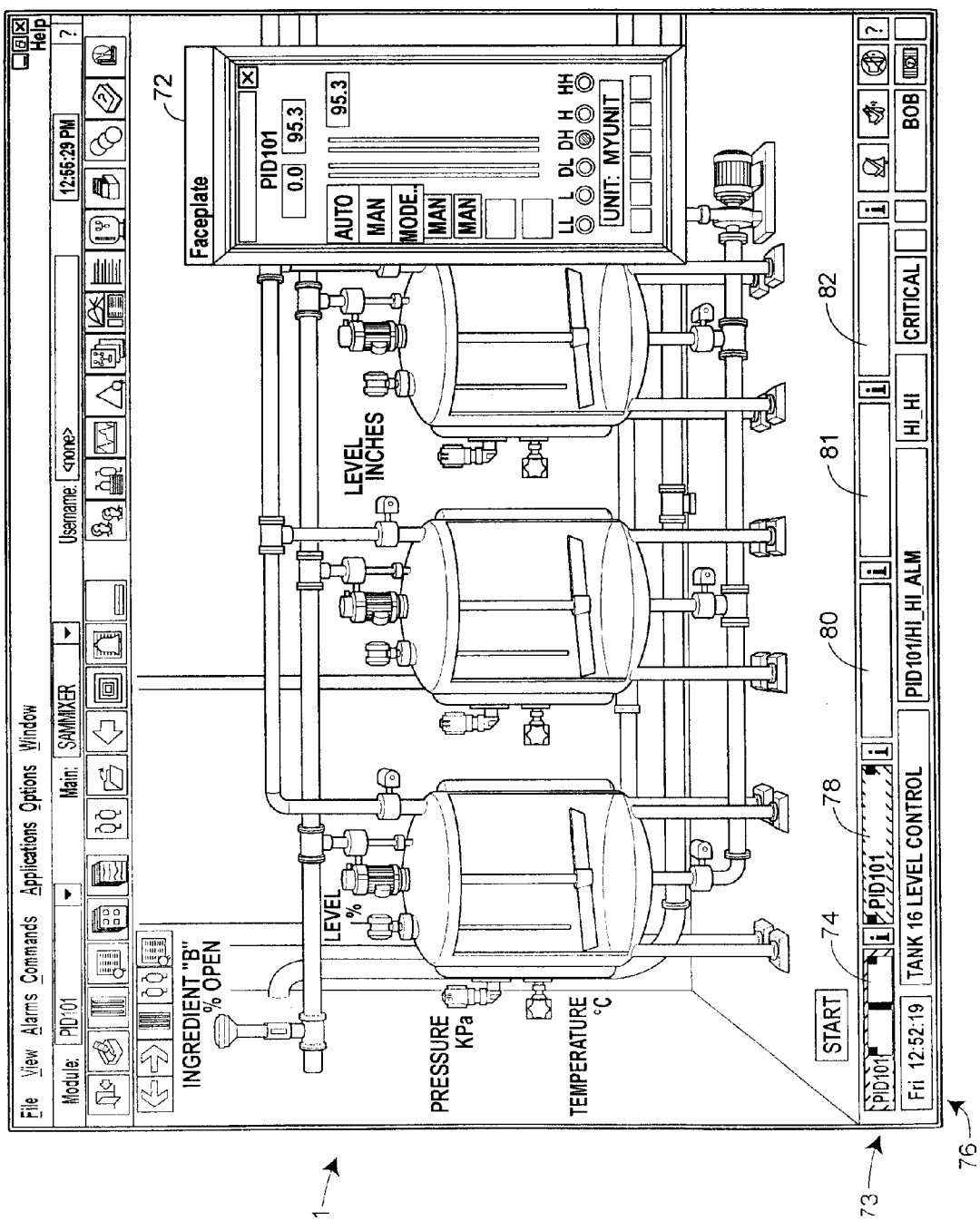
Figure 4:
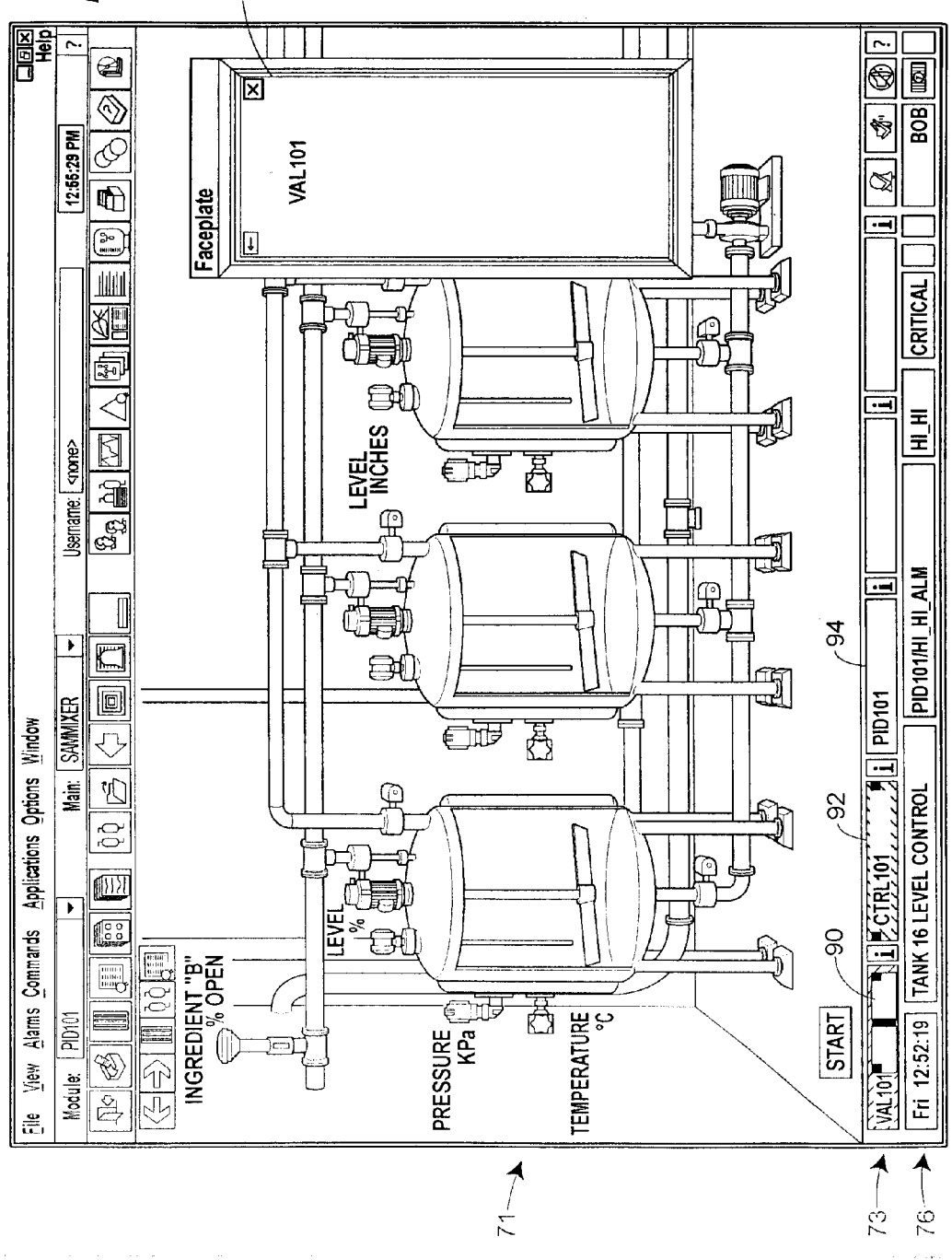
Figure 8:
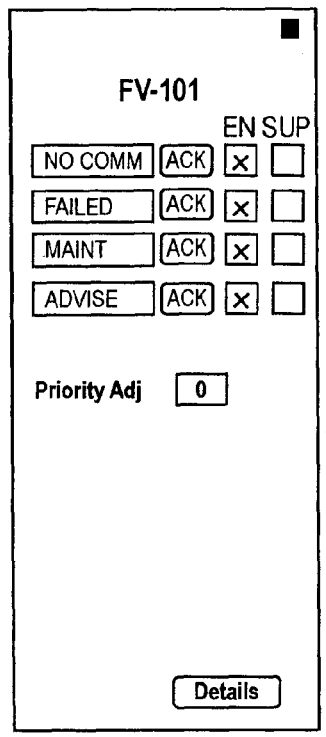
Figure 9:
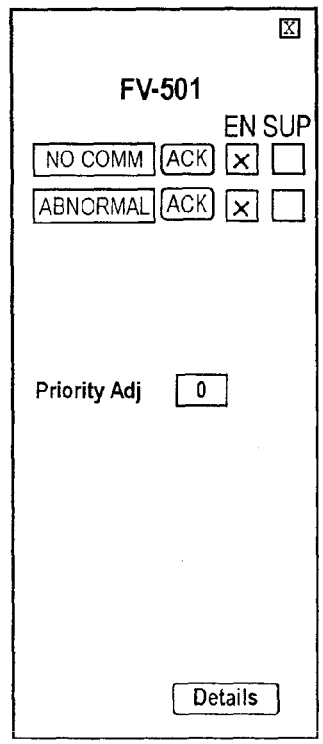
Figure 10:
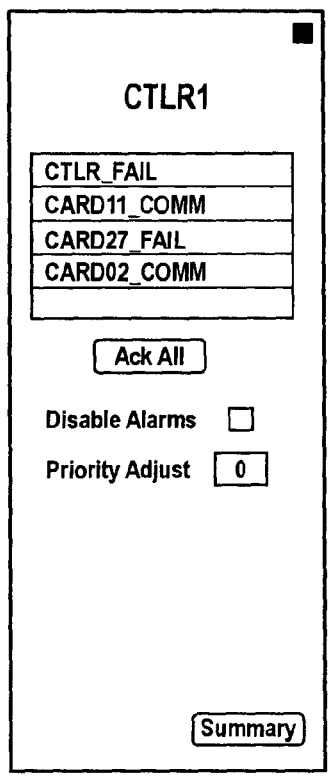
Figure 11:
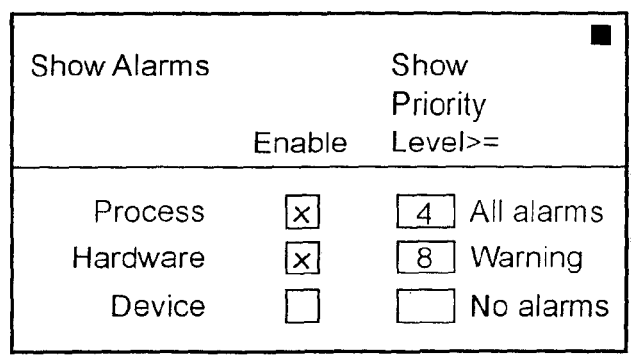

Preferably, users can configure alarm priorities so that a <container name> appears at most once in the alarm banner, so that a unit name (if any) appears in the alarm banner buttons instead of the <container name>, and so that the unit name appears at most once in the alarm banner. It may also be possible to configure the alarm banner 73 to filter out alarms by category, or by type, or by priority threshold (alarms below the threshold are not shown). Conceptually the configuration could be accomplished using a window something like that illustrated in FIG. 11 wherein a user can select the category of alarm to be displayed (e.g., process, hardware or device alarms) and the priority level for the alarms of each category. These settings are stored in the filter settings and used by the filter 68 to control which alarm indications are displayed to the user via the alarm banner 73. Of course, the operator or user may be able to set the filter settings to filter out any of the types, categories, priorities, etc. of alarms at different times to thereby customized the alarm banner to his or her needs at the time.

With the integrated alarm display banner 73 such as that illustrated in FIGS. 3 and 4, the screen 71 provides a single user with the information pertaining to different categories of alarms in essentially the same format which, in turn, allows a user to more readily understand the problems within the process control system 10 which may be resulting in process control errors or alarms. This, in turn, may help the user determine what devices or settings need to be altered, fixed, replaced, or maintained in order to bring the process 10 back into desired working conditions. The integrated display 71 is also very useful in the case in which a single person, such as an operator, also performs the functions of maintenance or engineer personnel in a process control system, which is generally the case in many small process control systems. In this use, the user does not have to view different displays or look at different databases to determine different types of errors within the system to diagnose a problem.

When the user chooses to view only process alarms, the user, in effect, converts the interface into the system in which only process control alarms are available to the user and can perform the typical functions associated with operator personnel. Nonetheless, alarms are still being received and stored in the database 66 in case the user decides to switch back, at some point, to view more categories of alarms. Still further, the filter 68 allows a user to view the different categories of alarms and thus be able to view all of the alarms when the number of outstanding alarms is not too great. At this time, the user can try to determine if the cause of some process alarms is a result of one or more device or hardware failures, as evidenced by received hardware and device alarms. However, when a major problem occurs which causes many alarms to appear, the user can choose not to view certain categories of alarms, such as the device or hardware alarms, or priorities of alarms and thus focus solely on the process alarms for which he or she might have primary responsibility. In this manner, he or she can hand off the process, device or hardware alarms to other users who may use a version of the software interface 50 at a different workstation to display only those alarms. As a result, a user can view the alarms he or she thinks may be helpful to his or her main function but, when too many alarms are being displayed, can cut down the number of alarms by changing the filter settings. This, in turn, prevents the user from becoming overwhelmed by too many alarms.

Besides or in addition to an implementing an alarm banner, the alarm display and interface software 50 may include software that generates alarm summary objects (also referred to herein as windows, displays or controls) for the user, including for example active alarm summaries and suppressed alarm summaries. Active alarm summary displays may be designed using an alarm summary control, which provides additional filtering, sorting, scrolling, and context actions for summarizing the alarms present in the system. Such a summary control software module 110 is illustrated in FIG. 2. The display generated by the alarm summary control 110 may be configured to occupy different positions and amounts of the display area. For example, configurable widths may range from as large as the full width of the display area (in the supported display resolutions) to as narrow as half the full width. Configurable heights may, for example, range from as tall as the full height of the display area (excluding the framework for navigation buttons and alarm banner) to as narrow as half the full height. Thus a "full screen" alarm summary, two half screen alarm summaries (both side by side and over under) and four quarter size alarm summaries can be supported in one display. Of course, other sizes could be used as well.

The alarm summary control 110 may be configured to create a display that shows any of the properties of an active alarm, including, for example, a container name (module/node/device), an alarm identifier (path) (<container name>/<alarm parameter name>), a description for <container name>, a unit name (if any), a priority word, a latched alarm state word (alarm word or "OK"), a current alarm state word (alarm word or "OK"), a category name, a time of occurrence, a time of last state/priority change, an alarm message string, a source node name, etc.

Other properties available for active alarms used to control the presentation or for display navigation include an alarm category value (1=process, 2=hardware, 3=device), an area number (0 . . . 99), a priority numeric value (4 . . . 15), an acknowledgment state value (1=unacked, 0=acked), a latched alarm state value (>0 if active), a current alarm state value (>0 if active), a faceplate display name for <container name>, a primary control display name for <container name>, a detail display name for <container name>, etc.

An example of an active alarm summary display is illustrated in FIG. 12 in which the alarm summary display includes information about the time of the alarm, the unit in which the alarm occurred (if applicable), the alarm parameter, a description of the alarm, the type of alarm, a message associated with the alarm and the priority of the alarm. Of course, this and/or other summary information may be provided in other format if desired. FIG. 13 illustrates the same alarm summary information having colors used to highlight the alarms based on priority. Thus, high priority (critical) alarms are highlighted in, for example, red, medium alarms, such as advisory alarms, are highlighted in yellow and other alarms are not highlighted. FIG. 14 illustrates the use of different colored highlighting to highlight alarms according to alarm category. In FIG. 14, device alarms are highlighted. Of course, the use of highlighting or other indicia may be used to mark alarms within the alarm summary display according to any desired criteria, and marking or highlighting of different sections of the alarm summary display may be done according to different criteria. Thus, the priority field may be highlighted according to the priority, the alarm description and alarm parameter may be highlighted according to alarm category, etc.

In any event, each field to be displayed in an alarm summary display produced by the alarm summary control 110 may have any combination of the following presentation attributes configured. A background blinking based on acknowledgment state, a background color based on either priority value (using same color rules as alarm banner) or alarm category, and a hash overlay based on current alarm state. The alarm summary control may be configured to show alarms in any desired order, such as ack state/current alarm state/priority/time of occurrence (alarm banner order), time of occurrence (newest to oldest), time of last state/priority change (newest to oldest), alarm identifier (<container name>/<alarm parameter name>) (alphabetical), etc.

The alarm summary control 110 may be configured to show alarms with zero or more of the following filter criteria, (1) current alarm banner filter settings, (2) alarm category and priority thresholds (any combination of process, hardware, and device alarms and priority thresholds for each), (3) area name, (4) unit name, (5) <container name>, (6) acknowledgment state (0 or 1), (7) current alarm state >0, (8) time of occurrence <x days, y hours, z minutes relative to now, or (9) time of occurrence >x days, y hours, z minutes relative to now.

When an alarm summary display is presented on the display 69, a current user holding the proper security keys may change the filter criteria such as alarm category and priority thresholds (e.g., any combination of process, hardware, and device alarms and priority thresholds for each), acknowledgment state (0 or 1), current alarm state >0, time of occurrence <x days, y hours, z minutes relative to now or time of occurrence >x days, y hours, z minutes relative to now, etc.

Alarm summary displays may remain open or created for any length of time and, preferably, when the presentation attributes, alarm order, or filter criteria for an open alarm summary display are changed dynamically by a user, the configuration of the control 110 is not changed, and the changes are discarded when the alarm summary display is turned off. Of course, there are no limits (other than CPU resources) on the number of alarms that may appear (and be displayed) in an alarm summary control.

Also, the alarm summary control 110 may be used to perform operations with respect to an alarm such as acknowledging an alarm (normal parameter/field security rules apply), suppressing an alarm (normal parameter/field security rules apply), calling up the display for the <container name> holding an alarm, calling up the primary control display for the <container name> holding an alarm, calling up the detail display for the <container name> holding an alarm, launching or bringing up a diagnostic application with the appropriate module, device or node selected, i.e., a module for process alarms, a device for device alarms or a node (or a card) for hardware alarms.

If desired, the alarm summary display created by the control 110 can have an "Ack all" button which, when enabled for an open alarm summary, may be used to acknowledge all unacknowledged alarms that are included in this alarm summary (i.e., those which passed the workstation-wide and operator-wide alarm scope controls, and passed the current filter criteria for this alarm summary), including unacknowledged alarms that are in this summary but are not currently displayed. The effect is the same as individually selecting each unacknowledged alarm in the alarm summary and acknowledging that alarm.

Still further, the alarm display and interface software 50 may include a suppressed alarm summary control 112 which provides a suppressed alarm summary display. This display can be designed around a summary control which provides additional filtering, sorting, scrolling, and context actions for suppressed alarms. The characteristics of suppressed alarm summary controls 112 are like that for active alarm summary controls 110 described above, except that the suppressed alarm summary control 110 may also be configured to show any of the following properties of an active alarm including, <container name> (module/node/device), the alarm identifier (path) (<container name>/<alarm parameter name>), a description for <container name>, a unit name (if any) and a time of suppression.

Additionally, unit or plant area alarm displays can be generated to show all or a group of alarms associated with a unit or an area or other logical grouping of hardware within the process control system 10. A plant area display can provide a list of all plant area names and, for each plant area, provide a control which shows if the area is within the scope of the workstation and user (i.e. if alarms can be turned on or off), the current state of alarms being turned on or off. These controls can also be used to change the state, i.e., to turn areas or units on or off. The plant area display can also show alarm counts per each area (the counts are 0 if the area is turned off) such as counts for active/unacknowledged process, device and hardware alarms, active process, device and hardware alarms, and suppressed process, device and hardware alarms. The display may also provide a means to open an alarm summary control for any plant area. The default alarm summary control that appears may show all alarms in the area (process, hardware, and device) in, for example, ack state/current alarm state/priority/time of occurrence (alarm banner) order. Also, to allow users to configure different alarm banner displays or alarm summary displays for different workstations, it is possible to configure the name of the alarm banner display or alarm summary display on a per workstation basis. Of course, all of these displays may have different categories of alarms displayed therein in similar manners.

If desired, the alarm processing unit 64 keeps a set of alarm counts for the alarms which pass the workstation-wide alarm scope controls and makes these counts available for display. Alarm counts may be kept, for example, for the active/unacknowledged process, device and hardware alarms, for the active/acknowledged process, device and hardware alarms, and for the suppressed process, device and hardware alarms. These counts are preferably not affected by the alarm banner alarm category and priority threshold filter settings. For example, device alarms can be turned off in the alarm banner, but the counts for device alarms would still be accurate, given the workstation-wide alarm scope controls.

Still further, the software 50 may display an alarms parameter which is used to show the five most important alarms in a device (or a node) to be supported for each device or node which has device or hardware alarms enabled. This functionality makes it possible to acknowledge, disable or effect the priority of all device alarms for a device or hardware alarms for a node via a single parameter/field. A browser for the system may also browse to device alarms and hardware alarms. The alarm interface software 50 may support the ability to read/write alarm parameter fields of individual device alarms from control modules that run in the same node.

As will be understood, the alarm display and interface software 50 combines process, device and hardware alarms in a manner so that these different categories of alarms share similar behavior and may share, for example, alarm priority words, color coding, acknowledgment behavior, etc. If desired, individual alarm acknowledgment and suppression can work the same for all of these alarms. Also, an alarms parameter (like the one currently provided in each module for process alarms) can be used to show the five most important alarms in a device or node. This parameter can also be used to acknowledge, disable and adjust the effective priority of all hardware alarms for a node or device alarms for a device via a single parameter/field written. Because device alarms and hardware alarms belong to or are associated with plant areas, turning on/off alarms for an area can affect the device and hardware alarms for that area.

As currently provided with process alarms, users will be able to place links to fields of device and hardware alarm parameters in displays, such as the display 71 and a browser may be used in building displays that will support browsing to device and hardware alarms. Also, if desired, it will be possible to read/write alarm parameter fields of individual device and hardware alarms from control modules. The parameter browser used in creating module configurations will support browsing to device and hardware alarms.

Of course, process, device and hardware alarms have a category parameter that distinguishes them each other, and this parameter is readable by the alarm processing unit 64. As a result, the alarm banner and alarm summary displays may be configured to include/exclude any of process, device, hardware alarms, and may be configured to give the process, device and hardware alarms distinct appearances to enable a viewer to easily distinguish between these different categories of alarms.

If desired, an event chronicle database may be stored in a workstation or other device at the node which runs the software 50 or any other node to capture the state changes of process, device and hardware alarms and to store these changes in a manner that the history of the changes can be recovered. The event chronicle may, for example, store the current alarm state as one of SUPPRESSED, DISABLED, INACT/ACK, INACT/UNACK, ACT/UNACK or ACT/ACK. A default state for a device and hardware alarm is preferably INACT/ACK. When a download occurs that creates a device or hardware alarm, no initial state change record is generated to record the alarms "initial" INACT/ACK state. However, subsequent state changes detected would generate the appropriate alarm state change event record.

A process history view may use standard filter/sorting features to quickly find all process, device or hardware alarm state changes, specific categories of alarms from a single node, from a specific plant area, etc. Example event chronicle state change record sequences for process and device alarms could be as depicted in FIG. 15. Here the category word that appears for all alarm state change records is fixed according to the category of alarm. The message shown in the Desc2 field describes the condition within the alarm that changed. The word that appears in the Desc1 field indicates the state of the condition described in the Desc2 field: the normal alarm word if the condition is active; "OK" if the condition is inactive. Of course similar types of entries for hardware and other categories of alarms may also be provided in the event chronicle and other types of information for recording manipulations of the alarms could also be stored in any desired manner in the event chronicle database.

The device or hardware alarms are part of devices and hardware nodes as these are created in the configuration database. Thus, the alarms are created as part of the configuration in a manner similar to the manner in which other aspects of devices and nodes are created. When the configuration is created in the system, all device and hardware alarm behaviors for the device and hardware nodes may be set to be "off" by default. While these alarms are off, alarm parameters are unavailable for the device or hardware units so that these alarms do not appear as part of the configuration for the device or hardware unit and these alarms are not accessible via configuration parameter browsers. That is, the devices and hardware alarms do not appear in the system browser as being associated with the field devices and nodes. Furthermore, there is no run-time support for device and hardware alarms, and all device and hardware alert communications including any parameter polling used to maintain state information supporting device and hardware alarms is halted.

However, a user can enable device and hardware alarms using, for example, an on/off or checkbox style property of the device or hardware. When the alarms are enabled, the device or hardware name must conform to configuration system naming rules so that these names can be used to address alarm information or messages from the operator interface applications and other applications. Specifically, the name must conform to name rules, which may include, for example, maximum character length and character restrictions and must share the name space with modules, nodes, areas, and DST names or other names. Generally, if the device or hardware name does not conform to name rules used in the system, device and hardware alarms cannot be enabled and the user is notified. The description string entered for the device or hardware appears in the operator interface to help describe active alarms.

New configurable properties for configuring a device or a hardware unit may include the name of the faceplate display for this device or node and the name of the primary control display for this device or node. When device or hardware alarms are enabled for a device or hardware entity, an alarm parameter appears in the configuration system for each possible alarm that the system supports for that device or hardware entity. Information provided via the configuration system may include the manufacturer, type, and revision of the device or hardware unit which determines the number of the alarms that are available, their names, as well as the default values for the configurable properties. When alarms are enabled for a device or a hardware entity, the configuration system enables the user to see and change (if configurable) the name, alarm word, type and priority properties of each device alarm. Priority is generally configurable using the priorities that are currently defined using similar technique as is supported for alarms in modules. For example, default numerical values for priority may be COMM_ALM-15 ("CRITICAL"), ABNORM_ALM-11 ("WARNING"), FAILED_ALM-15 ("CRITICAL"), MAINT_ALM-7 ("ADVISORY"), ADVISE_ALM-7 ("ADVISORY").

To support device and hardware alarms, it will be possible to configure an association between a node and a plant area. This applies to all node types including controllers and various workstations, and local and remote nodes. New nodes may be associated with plant area 0. Nodes imported with no node association are associated with plant area 0. Device alarms are implicitly associated with the plant area that their node is associated with.

While the alarm display and interface software 50 has been described as being used in conjunction with Fieldbus and standard 4–20 ma devices, it can be implemented using any other external process control communication protocol and may be used with any other types of controller software. Although the alarm display and interface software 50 described herein is preferably implemented as software, it may be implemented in hardware, firmware, etc., and may be implemented by any other processor associated with the process control system 10. Thus, the routine 50 described herein may be implemented in a standard multi-purpose CPU or on specifically designed hardware or firmware as desired. When implemented in software, the software routine may be stored in any computer readable memory such as on a magnetic disk, a laser disk, or other storage medium, in a RAM or ROM of a computer or processor, etc. Likewise, this software may be delivered to a user or a process control system via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An alarm display system for use in a process control network having a user interface with a display mechanism and a multiplicity of communicatively interconnected devices adapted to generate and send alarm messages containing alarms of various categories to the user interface, the alarm display system comprising:
   an alarm receiver configured to receive the alarm messages from the multiplicity of devices to obtain a plurality of alarms of various categories;
   an alarm processing unit that processes the plurality of alarms for display based on at least one user customizable criterion to ascertain a set of alarms for display; and
   an alarm display unit that presents indications of the set of the alarms for display on the display mechanism, wherein the alarm display unit presents indications of alarms of various categories in an integrated manner on the display mechanism.

2. The alarm display system of claim 1, wherein the alarm processing unit includes an alarm filter that filters the plurality of alarms for display based on the least one user customizable criterion to ascertain the set of alarms for display.

3. The alarm display system of claim 2, wherein the alarm display unit is adapted to enable a user to change alarm filter settings associated with the alarm filter to filter the alarms by alarm categories.

4. The alarm display system of claim 2, wherein the alarm filter filters the alarms based on alarm category.

5. The alarm display system of claim 2, wherein the alarm display unit is adapted to enable a user to change alarm filter settings associated with the alarm filter to filter alarms by priority.

6. The alarm display system of claim 1, wherein the alarms of various categories include a process alarm related to the functionality of process control software and a hardware alarm related to the functionality of a device defining a node in the process control system.

7. The alarm display system of claim 6, wherein one of the hardware alarms relates to a controller.

8. The alarm display system of claim 6, wherein one of the hardware alarms relates to an input/output device connected between a controller and a field device.

9. The alarm display system of claim 6, wherein one of the hardware alarms relates to a workstation.

10. The alarm display system of claim 1, wherein the alarms of various categories include a device alarm related to the functionality of a field device and a hardware alarm related to the functionality of a device defining a node in the process control system.

11. The alarm display system of claim 1, wherein the alarms of various categories include process alarms related to the functionality of process control software, device alarms related to the functionality of field devices and hardware alarms related to the functionality of devices defining a node in the process control system.

12. The alarm display system of claim 1, wherein the alarm display unit presents indications of the alarms of various categories in an integrated manner using an alarm banner.

13. The alarm display system of claim 12, wherein the alarm banner is adapted to include the alarm indications for the alarms of various categories and a summary for a selected one of the alarm indications.

14. The alarm display system of claim 12, wherein the alarm display unit is adapted to provide a primary control display for a selected one of the alarm indications in the alarm banner.

15. The alarm display system of claim 12, wherein the alarm display unit is adapted to enable a user to suppress one or more of the alarms associated with one or more of the alarm indications in the alarm banner.

16. The alarm display system of claim 12, wherein the alarm display unit is adapted to enable a user to acknowledge one or more of the alarms associated with one or more of the alarm indications in the alarm banner.

17. The alarm display system of claim 12, wherein the alarm display unit is adapted to present indications of the alarms of various categories in an order based on the priority of the alarms.

18. The alarm display system of claim 12, wherein the alarm display unit is adapted to present indications of the alarms of various categories in an order based on the acknowledged status of the alarms.

19. The alarm display system of claim 1, wherein the alarm display unit is adapted to present indications of the alarms of various categories in an integrated manner using an alarm summary window that summarizes the alarms of various categories for display.

20. The alarm display system of claim 19, wherein the alarm summary window summarizes suppressed alarms but not active alarms.

21. The alarm display system of claim 19, wherein the alarm summary window summarizes active alarms but not suppressed alarms.

22. The alarm display system of claim 1, wherein the alarm display unit is adapted to present indications of the alarms of various categories associated with a particular node in the process control system.

23. The alarm display system of claim 1, wherein the alarm display unit is adapted to present indications of the alarms of various categories associated with a particular device in the process control system.

24. The alarm display system of claim 1, wherein the alarm display unit is adapted to present indications of the alarms of various categories associated with a particular unit in the process control system.

25. The alarm display system of claim 1, wherein the alarm display unit is adapted to present indications of the alarms of various categories associated with a particular area in the process control system.

26. The alarm display system of claim 1, wherein the alarms of various categories include a process alarm related to the functionality of process control software and a device alarm related to the functionality of a field device.

27. The alarm display system of claim 1, further including an event chronicle database that stores change information pertaining to the alarms of various categories.

28. The alarm display system of claim 1, wherein the alarm processing unit includes an alarm filter that filters the plurality of alarms for display based on at least one scope respectively associated with at least one of an operator and a workstation.

29. An alarm display system for use in a process control network that includes a user interface having a processor and a display mechanism coupled to the processor and having a multiplicity of communicatively interconnected devices adapted to generate and send alarm messages containing alarms of various categories to the user interface, the alarm display system comprising:
  a computer readable memory; and
  a routine stored on the computer readable memory and adapted to be implemented on the processor, wherein the routine;
    receives the alarm messages from the multiplicity of devices to obtain a plurality of alarms of various categories;
    processes the plurality of alarms for display based on at least one user customizable criterion to ascertain a set of alarms for display; and
    presents indications of the set of the alarms for display on the display mechanism, wherein the set of alarms for display includes alarms of various categories which are presented in an integrated manner on the display mechanism of the user interface.

30. The alarm display system of claim 28, wherein the routine processes the plurality of alarms by filtering the alarms based on alarm category.

31. The alarm display system of claim 30, wherein the routine is adapted to enable a user to change filter settings which effect the manner in which the routine filters the alarms.

32. The alarm display system of claim 30, wherein the routine processes the plurality of alarms by filtering the alarms based on alarm priority.

33. The alarm display system of claim 29, wherein the alarms of various categories include two or more of a process alarm related to the functionality of process control software, a device alarm related to the functionality of a field device and a hardware alarm related to the functionality of a device defining a node in the process control system.

34. The alarm display system of claim 29, wherein the routine presents the indications of the alarms for display in an integrated manner using an alarm banner.

35. The alarm display system of claim 34, wherein the alarm banner is adapted to include alarm indications for the alarms of various categories and a summary for a selected one of the alarm indications.

36. The alarm display system of claim 34, wherein the routine is adapted to provide a primary control display for a selected one of the alarm indications in the alarm banner.

37. The alarm display system of claim 29, wherein the routine is adapted to present indications of the alarms of various categories in an order based on a parameter associated with each of the various categories of alarms other than alarm category.

38. The alarm display system of claim 29, wherein the routine is adapted to present indications of alarms of various categories associated with a particular device in the process control system.

39. The alarm display system of claim 29, wherein the routine processes the plurality of alarms by filtering the alarms based on at least one scope respectively associated with at least one of an operator and a workstation.

40. A process control system, comprising:
  a user interface with a display mechanism;
  a multiplicity of communicatively interconnected devices adapted to generate and send alarm messages containing alarms of various categories to the user interface;
  an alarm receiver configured to receive the alarm messages from the multiplicity of devices to obtain a plurality of alarms of various categories;
  an alarm filter that filters the plurality of alarms for display based on at least one user customizable criterion to ascertain a set of alarms for display and allows adjustment from at least one predefined priority level respectively associated with the alarms to at least one offset priority respectively associated with the alarms; and
  an alarm display unit that presents indications of the set of the alarms for display on the display mechanism, wherein the alarm display unit presents indications of alarms of various categories in an integrated manner on the display mechanism.

41. The process control system of claim 40, wherein the alarm filter filters the alarms based on alarm category.

42. The process control system of claim 40, wherein one of the devices includes software that generates and sends one of a process alarm, a device alarm, or a hardware alarm and another one of the devices includes further software that generates and sends a different one of a process alarm, a device alarm or a hardware alarm, wherein a process alarm is related to the functionality of process control software, a device alarm is related to the functionality of a field device and a hardware alarm is related to the functionality of a device defining a node.

43. The process control system of claim 40, wherein the alarm display unit presents indications of the alarms of various categories in an integrated manner using an alarm banner.

44. The process control system of claim 43, wherein the alarm banner is adapted to include the alarm indications for the alarms of various categories and a summary for a selected one of the alarm indications.

45. The process control system of claim 43, wherein the alarm display unit is adapted to provide a primary control display for a selected one of the alarm indications in the alarm banner.

46. The process control system of claim 43, wherein the alarm display unit is adapted to enable a user to suppress one or more of the alarms associated with one or more of the alarm indications in the alarm banner.

47. The process control system of claim 43, wherein the alarm display unit is adapted to enable a user to acknowledge one or more of the alarms associated with one or more of the alarm indications in the alarm banner.

48. The process control system of claim 43, wherein the alarm display unit is adapted to present indications of the alarms of various categories in an order based on a parameter associated with each of the various categories of alarms other than alarm category.

49. The process control system of claim 40, wherein the alarm filter filters the alarms based on at least one scope respectively associated with at least one of an operator and a workstation.

50. The process control system of claim 40, wherein the alarm display unit is adapted to present indications of the alarms in an order based on the offset priority level.

51. A method of generating and displaying alarms in a process control system having a multiplicity of devices communicatively connected to a user interface, the method comprising the steps of:
   generating various categories of alarms in the multiplicity of devices;
   sending messages containing alarms of the various categories to the user interface;
   determining an adjusted priority level for at least one of the alarms based on a preconfigured priority level for the alarm;
   filtering the alarms received at the user interface based on at least one user customizable criterion; and
   displaying the alarms of various categories which pass the step of filtering on the user interface in an integrated display.

52. The method of claim 51, wherein the step of generating the alarms of various categories includes generating one or more of process alarms, device alarms and hardware alarms in two or more of the devices, wherein the process alarms are related to the functionality of process control software, the device alarms are related to the functionality of field devices and the hardware alarms are related to the functionality of devices defining a node within the process control system.

53. The method of claim 52, wherein the step of displaying includes the step of displaying the alarms of various categories in an alarm banner.

54. The method of claim 53, further including the step of enabling a user to select one of the alarms in the alarm banner and displaying more information about the selected alarm.

55. The method of claim 51, wherein the step of displaying includes the step of displaying an alarm summary having information about the alarms of various categories that have been generated.

56. The method of claim 51, further including the step of enabling a user to select the criterion used in the step of filtering to control the alarms displayed on the user interface.

57. The method of claim 56, wherein the step of filtering includes the step of filtering based on alarm category.

58. The method of claim 56, wherein the step of filtering includes the step of filtering based on alarm priority.

59. The method of claim 51, wherein the step of generating includes the step of providing each alarm with a parameter defining the alarm category.

60. The method of claim 51, wherein the step of displaying includes the step of displaying the alarms in an order based on the adjusted priority level.

61. The method of claim 56, wherein the step of filtering includes the step of filtering based on at least one scope respectively associated with at least one of an operator and a workstation.

62. An alarm display system for use in a process control network having a user interface with a display mechanism and a multiplicity of communicatively interconnected devices adapted to generate and send alarm messages containing alarms of various categories to the user interface, the alarm display system comprising:
   an alarm receiver configured to receive the alarm messages from the multiplicity of devices to obtain a plurality of alarms of various categories;
   an alarm processing unit that processes the plurality of alarms for display based on at least one user customizable criterion to ascertain a set of alarms for display and filters the plurality of alarms for display based on at least one scope respectively associated with at least one of an operator and a workstation; and
   an alarm display unit that present indications of the set of the alarms for display on the display mechanism, wherein the alarm display unit presents the indications of alarms of various categories in an integrated manner on the display mechanism.

* * * * *

UNITED STATES PATENT AND TRADEMARK OFFICE
CERTIFICATE OF CORRECTION

PATENT NO. : 6,774,786 B1
DATED : August 10, 2004
INVENTOR(S) : Robert B. Havekost et al.

It is certified that error appears in the above-identified patent and that said Letters Patent is hereby corrected as shown below:

Please replace all Figure Sheets (Sheets 1-8) with the substitute Figure Sheets (Sheets 1-10) attached hereto.

Column 3,
Line 20, please delete "has" and insert -- have --.

Column 6,
Line 2, please delete "smartfield" and insert -- smart field --.
Line 43, please delete "a".
Lines 66-67, please delete "indicting" and insert -- indicating --.

Column 7,
Lines 22-23, please insert -- be -- before "may".
Line 50, please insert -- I/O -- before "devices".

Column 8,
Line 38, please delete "including" and insert -- include --.

Column 10,
Line 7, please delete "to great or to small" and insert -- too great or too small --.
Line 9, please delete "to high or to low," and insert -- too high or too low, --.

Column 11,
Line 30, please delete "on" and insert -- one --.
Line 34, please insert -- be -- after "may".
Line 58, please delete "H1" and insert -- H1 --.

Column 15,
Line 3, please delete "a".
Line 8, please delete "deice" and insert -- device --.

Column 17,
Line 42, please delete "customized" and insert -- customize --.

Column 18,
Line 22, please delete "an" before "implementing".

UNITED STATES PATENT AND TRADEMARK OFFICE
CERTIFICATE OF CORRECTION

PATENT NO. : 6,774,786 B1
DATED : August 10, 2004
INVENTOR(S) : Robert B. Havekost et al.

It is certified that error appears in the above-identified patent and that said Letters Patent is hereby corrected as shown below:

Column 21,
Line 43, please insert -- from -- after "them".

Signed and Sealed this

Sixth Day of September, 2005

JON W. DUDAS
*Director of the United States Patent and Trademark Office*

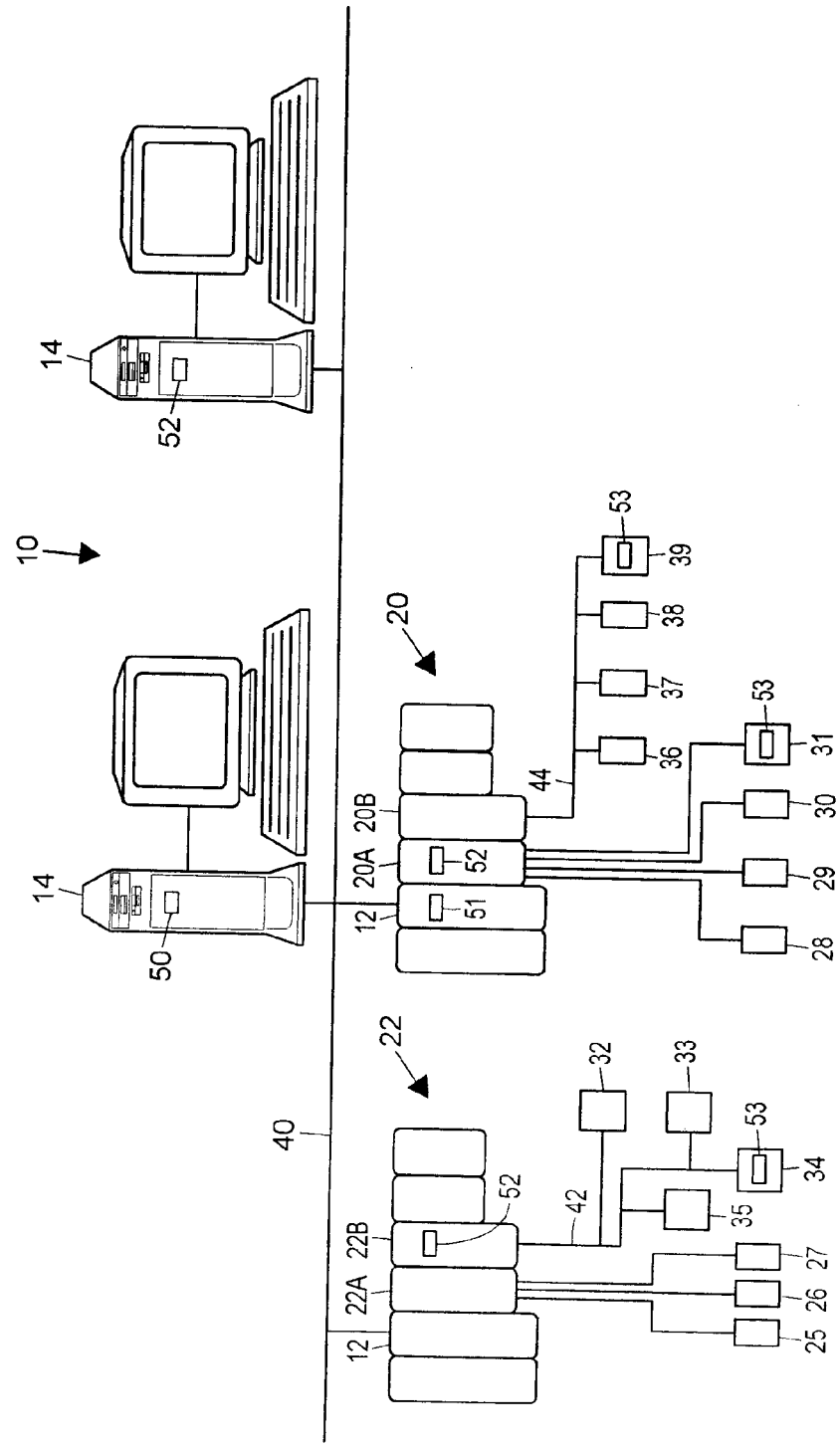

FIG. 5

| FIC-101 | i |
|---|---|

| Mon 15:10:04 | i | Reactor 1 jacket heat flow | i | FIC-101/HI_ALM | i | HIGH | i | WARNING |
|---|---|---|---|---|---|---|---|---|

Time  Unit  Alarm Parameter  Module Description  Alarm Word  Alarm Message  Priority Mon 15:10:04  REACTOR1  FIC-101/HI_ALM  Reactor 1 jacket heat flow  HIGH  High Alarm Value 1027 Limit 1000  WARNING

FIG. 6

| FV-101 | i |
|---|---|

| Mon 15:10:04 | i | Reactor 1 inlet valve | i | FV-101/FAILED_ALM | i | FAILED | i | CRITICAL |
|---|---|---|---|---|---|---|---|---|

Time  Unit  Alarm Parameter  Module Description  Alarm Word  Alarm Message  Priority Mon 15:10:04  REACTOR1  FV-101/FAILED_ALM  Reactor 1 inlet valve  FAILED  I/P Feedback limit: 103.47  CRITICAL

FIG. 7

| CTLR1 | i |
|---|---|

| Mon 15:10:04 | i | Room 4, cab 3, pos 2 | i | CTLR1/CARD04_FAIL | i | FAILED | i | CRITICAL |
|---|---|---|---|---|---|---|---|---|

Time  Unit  Alarm Parameter  Module Description  Alarm Word  Alarm Message  Priority Mon 15:10:04  CTLR1/CARD04_FAIL  Room 4, cab 3, pos 2  FAILED  Channel 7 failed  CRITICAL

FIG.12

| Occured | Unit | Alarm Parameter | Description | Alarm | Message | Priority |
|---|---|---|---|---|---|---|
| Wed 12:46:30 | | FIC-501/HI_ALM | Tank 5 outlet flow control | HI | Value = 1011.4 Limit = 1000 | WARNING |
| Wed 11:48:54 | REACTOR1 | FV-101/FAILED_ALM | Reactor 1 jacket flow sensor | FAILED | I/P Feedback limit 103.7 | WARNING |
| Wed 10:51:18 | REACTOR3 | LIC-301/HI_HI_ALM | Reactor 3 Level control | HIHI | Value = 81.4 Limit = 78 | CRITICAL |
| Wed 09:53:42 | | FIC-501/HI_ALM | Tank 5 outlet flow control | HI | Value = 1011.4 Limit = 1000 | WARNING |
| Wed 08:56:06 | REACTOR2 | FV-102/MAINT_ALM | Reactor 2 jacket flow sensor | MAINT | Travel limit 35001 | WARNING |
| Wed 07:58:30 | | FIC-501/HI_ALM | Tank 5 outlet flow control | HI | Value = 1011.4 Limit = 1000 | WARNING |
| Wed 07:00:54 | | FIC-501/HI_ALM | Tank 5 outlet flow control | HI | Value = 1011.4 Limit = 1000 | WARNING |
| Wed 06:03:18 | REACTOR1 | LIC-101/HI_HI_ALM | Reactor 1 Level control | HIHI | Value = 81.4 Limit = 78 | ADVISORY |
| Wed 05:05:42 | REACTOR2 | LIC-102/HI_HI_ALM | Reactor 2 Level control | HIHI | Value = 81.4 Limit = 78 | ADVISORY |
| Wed 04:08:06 | | FV-502/ADVISE_ALM | Tank 5 outlet flow sensor | ADVISE | Low variation for 60 minutes | ADVISORY |

Process: 1 / 34    Device: 1 / 2    Sort: Banner

FIG.13

| Occured | Unit | Alarm Parameter | Description | Alarm | Message | Priority |
|---|---|---|---|---|---|---|
| Wed 12:46:30 | | FIC-501/HI_ALM | Tank 5 outlet flow control | HI | Value = 1011.4 Limit = 1000 | WARNING |
| Wed 11:48:54 | REACTOR1 | FV-101/FAILED_ALM | Reactor 1 jacket flow sensor | FAILED | I/P Feedback limit 103.7 | WARNING |
| Wed 10:51:18 | REACTOR3 | LIC-301/HI_HI_ALM | Reactor 3 Level control | HIHI | Value = 81.4 Limit = 78 | CRITICAL |
| Wed 09:53:42 | | FIC-501/HI_ALM | Tank 5 outlet flow control | HI | Value = 1011.4 Limit = 1000 | WARNING |
| Wed 08:56:06 | REACTOR2 | FV-102/MAINT_ALM | Reactor 2 jacket flow sensor | MAINT | Travel limit 35001 | WARNING |
| Wed 07:58:30 | | FIC-501/HI_ALM | Tank 5 outlet flow control | HI | Value = 1011.4 Limit = 1000 | WARNING |
| Wed 07:00:54 | | FIC-501/HI_ALM | Tank 5 outlet flow control | HI | Value = 1011.4 Limit = 1000 | WARNING |
| Wed 06:03:18 | REACTOR1 | LIC-101/HI_HI_ALM | Reactor 1 Level control | HIHI | Value = 81.4 Limit = 78 | ADVISORY |
| Wed 05:05:42 | REACTOR2 | LIC-102/HI_HI_ALM | Reactor 2 Level control | HIHI | Value = 81.4 Limit = 78 | ADVISORY |
| Wed 04:08:46 | | FV-502/ADVISE_ALM | Tank 5 outlet flow sensor | ADVISE | Low variation for 60 minutes | ADVISORY |

Process: 1 / 34    Device: 1 / 2    Sort: Banner

*FIG. 14*

| | Occured | Unit | Alarm Parameter | Description | Alarm | Message | Priority |
|---|---|---|---|---|---|---|---|
| | Wed 12:46:30 | | FIC-501/HI_ALM | Tank 5 outlet flow control | HI | Value = 1011.4 Limit = 1000 | WARNING |
| ✓ | Wed 11:48:54 | REACTOR1 | FV-101/FAILED_ALM | Reactor 1 jacket flow sensor | FAILED | I/P Feedback limit 103.7 | WARNING |
| ✓ | Wed 10:51:18 | REACTOR3 | LIC-301/HI_HI_ALM | Reactor 3 Level control | HIHI | Value = 81.4 Limit = 78 | CRITICAL |
| ✓ | Wed 09:53:42 | | FIC-501/HI_ALM | Tank 5 outlet flow control | HI | Value = 1011.4 Limit = 1000 | WARNING |
| ✓ | Wed 08:56:06 | REACTOR2 | FV-102/MAINT_ALM | Reactor 2 jacket flow sensor | MAINT | Travel limit 35001 | WARNING |
| ✓ | Wed 07:58:30 | | FIC-501/HI_ALM | Tank 5 outlet flow control | HI | Value = 1011.4 Limit = 1000 | WARNING |
| ✓ | Wed 07:00:54 | | FIC-501/HI_ALM | Tank 5 outlet flow control | HI | Value = 1011.4 Limit = 1000 | WARNING |
| ✓ | Wed 06:03:18 | REACTOR1 | LIC-101/HI_HI_ALM | Reactor 1 Level control | HIHI | Value = 81.4 Limit = 78 | ADVISORY |
| ✓ | Wed 05:05:42 | REACTOR2 | LIC-102/HI_HI_ALM | Reactor 2 Level control | HIHI | Value = 81.4 Limit = 78 | ADVISORY |
| ✓ | Wed 04:08:46 | | FV-502/ADVISE_ALM | Tank-5 outlet flow sensor | ADVISE | Low variation for 60 minutes | ADVISORY |

FIG. 15

| Date Time | Event Type | Category | Area | Node | Module | Parameter | State | Level | Desc1 | Desc2 |
|---|---|---|---|---|---|---|---|---|---|---|
| xxxxxx | ALARM | PROCESS | AREA_A | CTLR1 | REACTOR 1 FIC-101 | HI_ALM | ACT UNACK | 11-WARNING | HIGH | High Alarm Value 1027 Limit 1000 |
| xxxxxx | ALARM | PROCESS | AREA_A | CTLR1 | REACTOR 1 FIC-101 | HI_ALM | ACT ACK | 11-WARNING | HIGH | High Alarm Value 1014 Limit 1000 |
| xxxxxx | ALARM | PROCESS | AREA_A | CTLR1 | REACTOR 1 FIC-101 | HI_ALM | INACT ACK | 11-WARNING | HIGH | High Alarm Value 998 Limit 1000 |

| Date Time | Event Type | Category | Area | Node | Module | Parameter | State | Level | Desc1 | Desc2 |
|---|---|---|---|---|---|---|---|---|---|---|
| xxxxxx | ALARM | DEVICE | AREA_A | CTLR1 | REACTOR 1 FV-101 | FAILED_ALM | ACT UNACK | 15-CRITICAL | FAILED | I/P Feedback limited: 103.47 |
| xxxxxx | ALARM | PROCESS | AREA_A | CTLR1 | REACTOR 1 FV-101 | FAILED_ALM | ACT ACK | 15-CRITICAL | FAILED | I/P Feedback limited: 103.47 |
| xxxxxx | ALARM | PROCESS | AREA_A | CTLR1 | REACTOR 1 FV-101 | FAILED_ALM | INACT ACK | 15-CRITICAL | OK | I/P Feedback limited: 99.8 |